US012580314B2

(12) United States Patent
Huang

(10) Patent No.: US 12,580,314 B2
(45) Date of Patent: Mar. 17, 2026

(54) ANTENNA ASSEMBLY AND ELECTRONIC DEVICE

(71) Applicant: GUANGDONG OPPO MOBILE TELECOMMUNICATIONS CORP., LTD., Dongguan (CN)

(72) Inventor: Wuxin Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 524 days.

(21) Appl. No.: 18/148,488

(22) Filed: Dec. 30, 2022

(65) Prior Publication Data

US 2023/0170617 A1     Jun. 1, 2023

Related U.S. Application Data

(63) Continuation of application No. PCT/CN2021/096769, filed on May 28, 2021.

(30) Foreign Application Priority Data

Aug. 14, 2020    (CN) .......................... 202010821435.8

(51) Int. Cl.
*H01Q 9/04*          (2006.01)
*H01Q 1/24*          (2006.01)
(Continued)

(52) U.S. Cl.
CPC ............. *H01Q 9/0407* (2013.01); *H01Q 1/24* (2013.01); *H01Q 1/48* (2013.01); *H04B 5/24* (2024.01); *H04B 5/43* (2024.01)

(58) Field of Classification Search
CPC ........... H01Q 1/48; H01Q 1/24; H01Q 9/0407
See application file for complete search history.

(56) References Cited

U.S. PATENT DOCUMENTS

| 10,193,597 B1 | 1/2019 | Garrido Lopez |
| 2010/0026582 A1 | 2/2010 | Choi et al. |
| | (Continued) | |

FOREIGN PATENT DOCUMENTS

| CN | 105529531 | 4/2016 |
| CN | 105552545 | 5/2016 |
| | (Continued) | |

OTHER PUBLICATIONS

EPO, Extended European Search Report for EP Application No. 21855179.4, Jan. 4, 2024.
(Continued)

*Primary Examiner* — Graham P Smith
(74) *Attorney, Agent, or Firm* — Hodgson Russ LLP

(57) ABSTRACT
Embodiments of the present application provide an antenna assembly and an electronic device. The antenna assembly comprises a near field communication chip and a first conductive structure; the first conductive structure is electrically connected to the near field communication chip to transmit near field communication excitation current supplied by the near field communication chip; the first conductive structure is provided with one or more first gaps; when the first conductive structure transmits the near field communication excitation current, the first conductive structure can generate a magnetic field, and the magnetic field generated by the first conductive structure can radiate to the outside by means of the first gaps.

18 Claims, 13 Drawing Sheets

(51) Int. Cl.
    *H01Q 1/48*         (2006.01)
    *H04B 5/24*         (2024.01)
    *H04B 5/43*         (2024.01)

(56)               References Cited

U.S. PATENT DOCUMENTS

| | | | |
|---|---|---|---|
| 2014/0002313 A1 | 1/2014 | Yang et al. | |
| 2015/0009077 A1 | 1/2015 | Lee et al. | |
| 2019/0326659 A1* | 10/2019 | Lyu | H04B 5/77 |

FOREIGN PATENT DOCUMENTS

| | | |
|---|---|---|
| CN | 206194944 | 5/2017 |
| CN | 110176670 | 8/2019 |
| CN | 210838090 | 6/2020 |
| CN | 111969303 | 11/2020 |
| EP | 3787194 | 3/2021 |
| WO | 2017206470 | 12/2017 |

OTHER PUBLICATIONS

CNIPA, First Office Action for CN Application No. 202010821435. 8, Aug. 30, 2021.
CNIPA, Second Office Action for CN Application No. 202010821435. 8, Mar. 31, 2022.
WIPO, International Search Report and Written Opinion for PCT/CN2021/096769, Aug. 18, 2021.
CNIPA, Third Office Action for CN Application No. 202010821435. 8, Sep. 27, 2022.

\* cited by examiner

ANTENNA ASSEMBLY AND ELECTRONIC DEVICE

CROSS-REFERENCE TO RELATED APPLICATIONS

The present application is a continuation of International Application No. PCT/CN2021/096769, filed on May 28, 2021, which claims priority to Chinese Patent Application No. 202010821435.8, filed on Aug. 14, 2020, the entire disclosures of which are incorporated by reference herein.

TECHNICAL FIELD

The present disclosure relates to the field of electronics, and in particular to an antenna assembly and an electronic device.

BACKGROUND

In recent years, the Near Field Communication (NFC) technology is increasing widely applied in electronic products. A NFC antenna is the most critical part of the overall performance of an NFC system. High-frequency magnetic lines may be generated based on the NFC antenna to allow one device to be coupled with other devices in a form of AC magnetic field, such that data may be transmitted at a high speed, and data interaction may be performed safely and easily.

SUMMARY OF THE DISCLOSURE

The present disclosure provides an antenna assembly and an electronic device to enhance a radiation strength that the antenna assembly radiates a near-field communication signal, and to improve the radiation performance of the electronic device.

The present disclosure provides an antenna assembly, including:

a near-field communication chip, configured to provide a near-field communication excitation current; and a first conductive structure, electrically connected to the near-field communication chip to transmit the near-field communication excitation current, wherein the first conductive structure defines one or more first gaps: when the first conductive structure transmits the near-field communication excitation current, the first conductive structure generates a magnetic field, and the magnetic field generated by the first conductive structure is radiated to an outside through the one or more first gaps.

The present disclosure provides an electronic device, including the antenna assembly as mentioned in the above, a middle frame, and a main circuit board arranged on the middle frame. The first conductive structure is arranged on the middle frame, and the near-field communication chip is arranged on the main circuit board.

DETAILED DESCRIPTION

Figure 1:
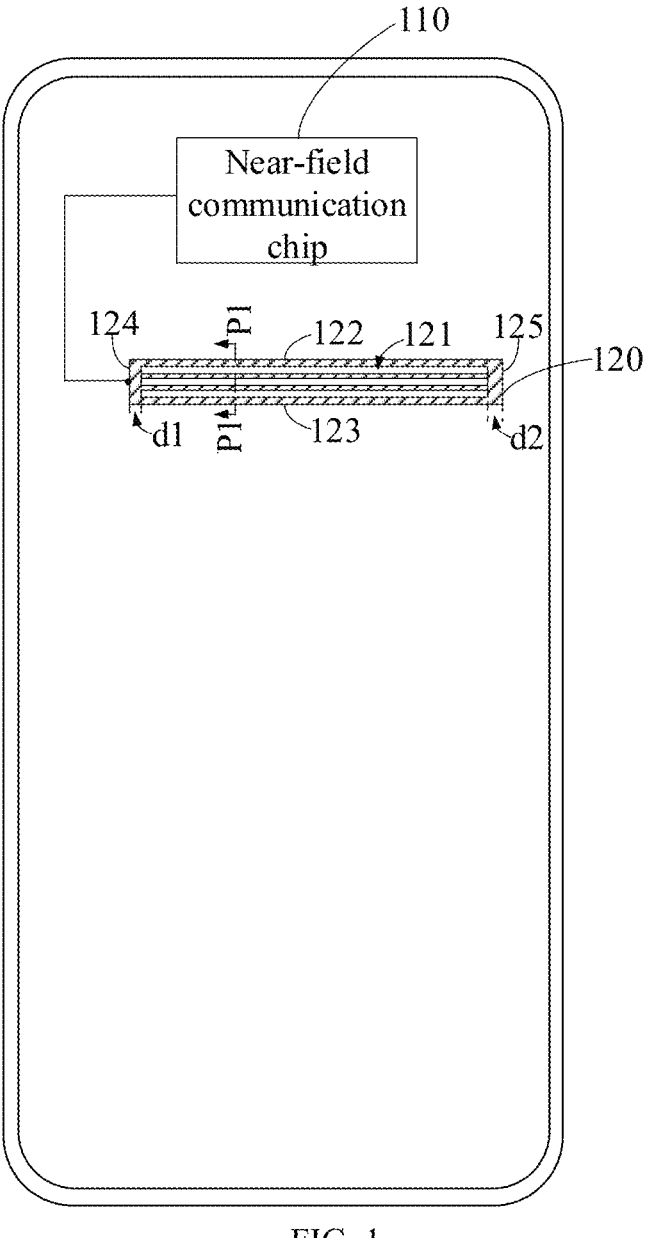
FIG. 1 is a first structural schematic view of an antenna assembly according to an embodiment of the present disclosure.

In practical, as the electronic technology develops, electronic devices are becoming smaller and thinner. Since the internal space of electronic device is limited, the radiation strength of the NFC antenna is limited. How to reasonably design the NFC antenna for electronic devices is a challenge that needs to be solved.

Based on the above problems, the present disclosure provides an antenna assembly, including:

a near-field communication chip, configured to provide a near-field communication excitation current; and a first conductive structure, electrically connected to the near-field communication chip to transmit the near-field communication excitation current, wherein the first conductive structure defines one or more first gaps: when the first conductive structure transmits the near-field communication excitation current, the first conductive structure generates a magnetic field, and the magnetic field generated by the first conductive structure is radiated to an outside through the one or more first gaps.

According to the embodiments of the present disclosure, one or more first gaps are defined in the first conductive structure, such that a magnetic field generated by the first conductive structure may penetrate the first conductive structure itself through the first gaps, the radiation intensity that the antenna assembly radiates the near-field communication signals may be improved, and the radiation performance of the antenna assembly is improved.

In some embodiments, the number of the one or more first gaps is more than one, and the more than one first gaps are spaced apart from each other.

In some embodiments, the first conductive structure comprises a first side edge and a second side edge opposite to the first side edge, and the more than one first gaps are arranged in sequence in a direction from the first side edge towards the second side edge.

In some embodiments, the first conductive structure further comprises a third side edge and a fourth side edge, the third side edge is connected between an end of the first side edge and an end of the second side edge, the fourth side edge is connected between the other end of the first side edge and the other end of the second side edge, each of a length of the first side edge and a length of the second side edge is greater than each of a length of the third side edge and a length of the fourth side edge.

In some embodiments, the number of the one or more first gaps is more than one, the more than one first gaps are spaced apart from each other and are misaligned with each other.

In some embodiments, a minimum area of a cross section of the first conductive structure along a direction perpendicular to a transmission direction of the near-field communication excitation current is greater than a first predetermined value.

In some embodiments, the first conductive structure is a printed circuit or a metal sheet on a flexible circuit board.

In some embodiments, the first conductive structure comprises a first portion and a second portion, the second portion is bent with respect to the first portion, and each of the first portion and the second portion defines the one or more first gaps.

In some embodiments, the antenna assembly further includes a second conductive structure, wherein the second conductive structure is arranged with a first feed end and a connection end spaced apart from the first feed end, the first feed end is electrically connected to the near-field communication chip, the connection end is electrically connected to the first conductive structure, the second conductive structure is configured to transmit the near-field communication excitation current cooperatively with the first conductive structure.

In some embodiments, the antenna assembly further includes a ground plane, wherein the second conductive structure is arranged with a first ground end, the first ground end is electrically connected to the ground plane.

In some embodiments, the near-field communication chip is configured to provide a differential excitation current, the ground plane comprises a first ground point and a second ground point spaced apart from the first ground point, a conductive path of the ground plane is formed between the first ground point and the second ground point; and the second conductive structure is arranged with a first ground end, the first conductive structure is arranged with a second ground end, the first ground end is electrically connected to the first ground point, the second ground end is electrically connected to the second ground point, the first conductive structure, the conductive path, and the second conductive structure cooperatively form a conductive circuit for transmitting the differential excitation current.

In some embodiments, the antenna assembly further includes a ground plane. The second conductive structure includes:

a first conductive sub-structure, electrically connected to the near-field communication chip and to the ground plane; and a second conductive sub-structure, spaced apart from the first conductive sub-structure and being electrically connected to the first conductive structure and to the ground plane.

In some embodiments, the second conductive structure defines one or more second gaps; and when the second conductive structure transmits the near-field communication excitation current, the second conductive structure generates a magnetic field, and the magnetic field generated by the second conductive structure is radiated to an outside through the one or more second gaps.

In some embodiments, when the first conductive structure and the second conductive structure transmit the near-field communication excitation current, the first conductive structure generates a first near-field communication radiation field, the second conductive structure generates a second near-field communication radiation field, the first near-field communication radiation field at least partially overlaps with the second near-field communication radiation field.

In some embodiments, the antenna assembly further includes a first non-near-field communication chip configured to provide a first non-near-field communication excitation current. The second conductive structure is further arranged with a second feed end spaced apart from the first feed end, and the second feed end is electrically connected to the first non-near-field communication chip to transmit the non-near-field communication excitation current.

In some embodiments, the antenna assembly further includes a first non-near-field communication chip and a second non-near-field communication chip. The first non-near-field communication chip is configured to provide a first non-near-field communication excitation current, and the second non-near-field communication chip is configured to provide a second non-near-field communication excitation current. The first conductive sub-structure is electrically connected to the first non-near-field communication chip, the first conductive sub-structure is configured to transmit the first non-near-field communication excitation current. The second conductive sub-structure is electrically connected to the second non-near-field communication chip, the second conductive sub-structure is configured to transmit the second non-near-field communication excitation current.

The present disclosure further provides an electronic device, including the antenna assembly according to any one of the above embodiments, a middle frame, and a main circuit board arranged on the middle frame. The first conductive structure is arranged on the middle frame, and the near-field communication chip is arranged on the main circuit board.

The present disclosure further provides an electronic device, including:

the antenna assembly according to any one of claims 10 to 16;

a middle frame and a rear cover connected to the middle frame, wherein the first conductive structure is arranged on a middle plate of the middle frame, and the second conductive structure is arranged a side frame of the middle frame or on the rear cover.

In some embodiments, the middle frame comprises a third conductive structure and a fourth conductive structure, the second conductive structure is disposed between the third conductive structure and the fourth conductive structure, a first gap is defined between the third conductive structure and the second conductive structure, and a second gap is defined between the fourth conductive structure and the second conductive structure.

In some embodiments, the second conductive structure, a part of the third conductive structure, and a part of the fourth conductive structure and are disposed at a same end of the middle frame.

The technical solutions in the embodiments of the present disclosure will be clearly and completely described below by referring to the accompanying drawings of the embodiments. Obviously, the described embodiments show only a part of but not all of the embodiments of the present disclosure. Based on the embodiments in the present disclosure, all other embodiments obtained by any ordinary skilled person in the art without creative work shall fall within the scope of the present disclosure.

Embodiments of the present disclosure provide an antenna assembly that may be applied to an electronic device. The electronic device may be a device such as a smartphone, a tablet computer, and so on: or may be a gaming device, an augmented reality (AR) device, an automotive device, a data storage device, an audio playback device, a video playback device, a laptop computer, a desktop computing device, and so on.

As shown in FIG. 1, FIG. 1 is a first structural schematic view of an antenna assembly according to an embodiment of the present disclosure. The antenna assembly 100 includes a near field communication chip (NFC IC) 110 and a first conductive structure 120.

The NFC chip 110 may be configured to provide a near-field communication signal, and that is, the NFC chip 110 is configured to provide a near-field communication excitation current. The NFC excitation current may be a differential excitation current. The differential excitation current may include two current signals, and the two current signals have a same amplitude and are in opposite phase. Alternatively, it may be interpreted as a difference between phases of the two current signals is 180 degrees. In addition, the differential excitation current may be a balanced signal. It is understood that, in a process of signal transmission, an analogue signal may be an unbalanced signal when being transmitted directly. When the original analogue signal is inverted, and the inverted analogue signal and the original analogue signal are transmitted simultaneously, the inverted analogue signal and the original analogue signal may be named as balanced signals.

To be noted that, the NFC excitation current may be the unbalanced signal. For example, a converter (such as a Balun) may be configured in a circuit. The converter may convert the balanced signals to the unbalanced signal. The unbalanced signal is a single-ended signal. In this case, the converted single-ended signal may be electrically connected to the first conductive structure 120, and the other signal end of the NFC chip may be grounded, allowing the unbalanced signal to be transmitted.

The first conductive structure 120 may be configured as an antenna for an electronic device to receive or transmit communication signals in a plurality of frequency bands. The first conductive structure 120 may be configured to be in various shapes to serve as antennas in various design forms. For example, the first conductive structure 120 may be configured to be one or more of a ring-shaped antenna, a patch antenna, an inverted F-shaped antenna, an enclosed antenna, an open gap antenna, a planar inverted F-shaped antenna, a spiral antenna, a ribbon antenna, a monopole antenna, and a dipole antenna.

The first conductive structure 120 is connected to the NFC chip 110 to transmit the NFC excitation current provided by the NFC chip 110. The first conductive structure 120 defines one or more first gaps 121. For example, the first conductive structure 120 may define one gap 121, two gaps 121, three gaps 121, five gaps 121, or other numbers of gaps 121. When the first conductive structure 120 is transmitting the NFC excitation current, the first conductive structure 120 may generate a magnetic field when being conducted. The magnetic field generated by the first conductive structure 120 may be radiated to an outside through the first gaps 121, such that a radiation area of the antenna assembly 100 while transmitting the NFC signals may be increased, and the radiation intensity that the antenna assembly 100 transmits the NFC signals may be improved.

In the art, the number of loops of coils that transmit the NFC signals is increased to improve the magnetic field strength. However, in this way, the antenna assembly may occupy more space of the electronic device. By contrast, in the present disclosure, the radiation intensity that the antenna assembly 100 transmits the NFC signals may be improved without increasing the space of the electronic device occupied by the antenna assembly 100.

In the present embodiment, the number of first gaps 121 may be more than one. For example, the number of first gaps 121 may be three, and the three first gaps 121 may be arranged in an array. For example, as shown in FIG. 1, the first conductive structure 120 may be rectangular plate-shaped. The first conductive structure 120 may include a first side edge 122, a second side edge 123, a third side edge 124, and a fourth side edge 125. The first side edge 122 is opposite to the second side edge 123. The third side edge 124 is opposite to the fourth side edge 125. The third side edge 124 is connected between an end of the first side edge 122 and an end of the second side edge 123. The fourth side edge 125 is connected between the other end of the first side edge 122 and the other end of the second side edge 123. The three first gaps 121 may be located along a length direction of the first conductive structure 120. That is, the three first gaps 121 are arranged successively along a direction from the first side edge 122 towards the second side edge 123. It shall be understood that the three first gaps 121 may be arranged successively along a width direction of the first conductive structure 120, along a direction from the third side edge 124 towards the fourth side edge 125.

To be noted that, in the description of the present disclosure, terms such as "first", "second", "third", "fourth", and so on, are used only to distinguish similar objects and shall not be interpreted as indicating or implying relative importance or implicitly specifying the number of an indicated technical feature. For example, the first side edge 122 may alternatively be a side edge located at a right of the first conductive structure 120, and the third side edge 124 may alternatively be a side edge located at a bottom of the first conductive structure 120.

It shall be understood that a positional relationship between the NFC chip 110 and the first conductive structure 120 in the electronic device shown in FIG. 1 is exemplary only and is not limited. Positions of the NFC chip 110 and the first conductive structure 120 in the electronic device may be determined based on actual needs.

Figure 2:
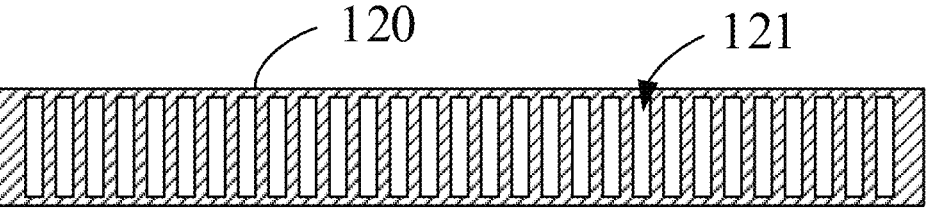
FIG. 2 is a second structural schematic view of a first conductive structure in the antenna assembly shown in FIG. 1.

In the present embodiment, the more than one first gaps 121 may be arranged successively along the length direction of the first conductive structure 120. For example, the three first gaps 121 may alternatively be arranged successively along a direction from the third side edge 124 towards the fourth side edge 125, as shown in FIG. 2, FIG. 2 is a second structural schematic view of the first conductive structure in the antenna assembly shown in FIG. 1.

In some embodiments, the more than one first gaps 121 may alternatively be arranged successively along other directions of the first conductive structure 120. For example, the first gaps 121 may be arranged in a diagonal direction of the first conductive structure 120 or a direction of any other angles, such as 60°, or 75°, or 120°, and so on.

As shown in FIG. 1, the more than one first gaps 121 are aligned with each other near the third side edge 124. Further, each first gap 121 is arranged at a first predetermined distance d1 from the third side edge 124, and the first predetermined distance d1 is predetermined. The first pre-determined distance d1 may be a distance that is relatively near the third side edge 124 but does not penetrate the third side edge 124. For example, the first pre-determined distance d1 may be 0.5 mm, or 1 mm, or 2 mm, or in other values. The more than one first gaps 121 are aligned with each other near the fourth side edge 125. Further, each first gap 121 is arranged at a second predetermined distance d2 from the fourth side edge 125, and the second predetermined distance d2 is predetermined. The second predetermined distance d2 may be a distance that is relatively near the fourth side edge 125 but does not penetrate the fourth side edge 125. For example, the second predetermined distance d2 may be 0.5 mm, or 1 mm, or 2 mm, or in other values. The second predetermined distance d2 may be equal to or different from the first predetermined distance d1. It shall be understood that when the first gap 121 is defined on the first conductive structure 120, only one row of first gap 121 may be defined in the direction from the first side edge 122 towards the second side edge 123, and ends of the first gap 121 may be as close as possible to the third side edge 124 and the fourth side edge 125. In this way, as few first gaps 121 as possible may be defined to increase the radiation strength that the antenna assembly 100 transmits the NFC signals.

Figure 3:
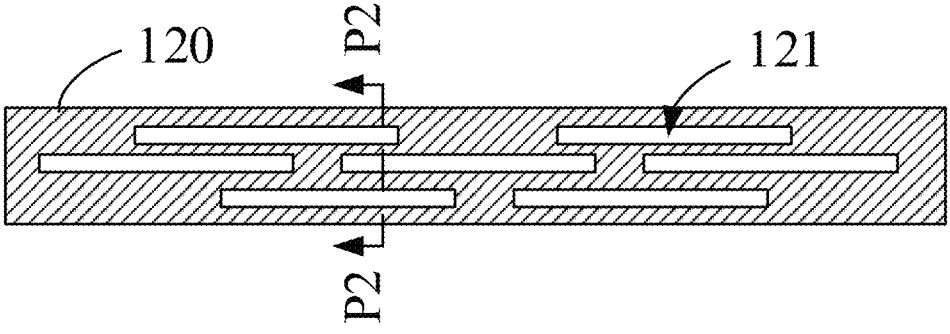
FIG. 3 is a third structural schematic view of a first conductive structure in the antenna assembly shown in FIG. 1.

As shown in FIG. 3. FIG. 3 is a third structural schematic view of the first conductive structure in the antenna assembly shown in FIG. 1. The more than one first gaps 121 of the present embodiment may be misaligned with each other. For example, the antenna assembly 100 may include seven first gaps 121. The seven first gaps 121 may be arranged in three columns. Two first gaps 121 are arranged in a first column. Three first gaps 121 are arranged in a second column. A portion (or the entire) of a first first gap 121 in the first column is disposed between the first two first gaps 121 in the second column. A portion (or the entire) of a second first gap 121 in the first column is disposed between the last two first gaps 121 in the second column. Two first gaps 121 are arranged in a third column. A portion (or the entire) of a first first gap 121 in the third column is disposed between the first two first gaps 121 in the second column. A portion (or the entire) of a second first gap 121 in the third column is disposed between the last two first gaps 121 in the second column.

Figure 4:
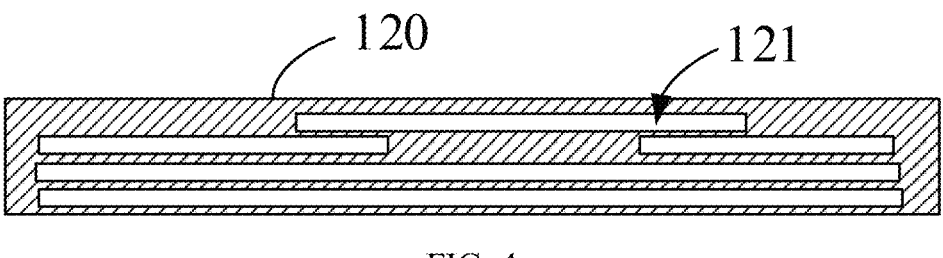
FIG. 4 is a fourth structural schematic view of a first conductive structure in the antenna assembly shown in FIG. 1.

To be noted that, in the present embodiment, a part of the more than one first gaps 121 may be arranged in an array, and a part of the more than one first gaps 121 may be misaligned with each other, such as shown in FIG. 4. FIG. 4 is a fourth structural schematic view of the first conductive structure in the antenna assembly shown in FIG. 1. The first conductive structure 120 of the present embodiment may include five first gaps 121. One first gap 121 is arranged in a first column, and one first gap 121 is arranged in a second column. The first gap 121 in the second column and the first gap 121 in the first column are arranged in an array. Two first gaps 121 are arranged in a third column, and one first gap 121 is arranged in a fourth column. The first gap 121 in the fourth column is disposed between the two first gaps 121 in the third column.

Figure 5:
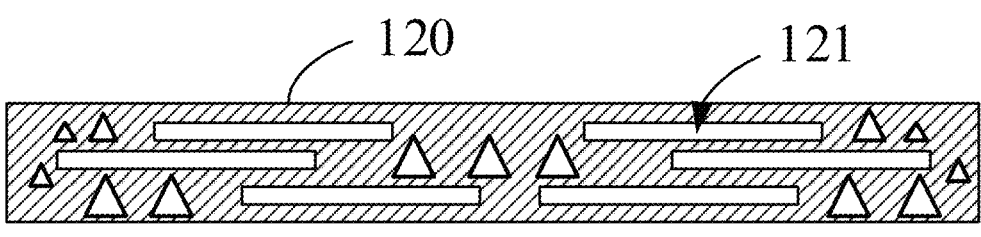
FIG. 5 is a fifth structural schematic view of a first conductive structure in the antenna assembly shown in FIG. 1.

In the present embodiment, the more than one first gaps 121 may have a same shape. For example, an orthographic projection of each of the more than one first gaps 121 is rectangular (such as shown in FIG. 1), or squared, or triangular, and so on. Alternatively, the more than one first gaps 121 may have different shapes, or some of the more than one first gaps 121 may have different shapes. For example, orthographic projections of some of the more than one first gaps 121 are rectangular, and orthographic projections of some of the more than one first gaps 121 are triangular, such as shown in FIG. 5, FIG. 5 is a fifth structural schematic view of the first conductive structure in the antenna assembly shown in FIG. 1.

The more than one first gaps 121 may have a same size. For example, each of the more than one first gaps 121 is a rectangle having a length of m and a width of n (such as shown in FIG. 1). Of course, more than one first gaps 121 may have different sizes, or some of the more than one first gaps 121 may have different sizes. For example, some of the more than one first gaps 121 are rectangles, each having a length of m and a width of n; and some of the more than one first gaps 121 are rectangles, each having a length of a and a width of b. The value of a is not equal to the value of m, and the value of b is not equal to the value of n (such as shown in FIG. 3). Of course, all of the more than one first gaps 121 may have a same shape and a same size: or shapes and sizes of all of the more than one first gaps 121 are different from each other; or shapes and sizes of some of the more than one first gaps 121 are different from each other.

According to the formula RI=ρL/S1, the ρ represents a resistivity of a resistor and is determined by the nature of the resistor, the L represents a length of the resistor, the S1 represents a cross-sectional area of the first conductive structure 120. It can be known that when the cross-sectional area of the first conductive structure 120 is reduced, a resistance value of the first conductive structure 120 may be increased. In this case, the signal transmission performance of the antenna assembly 100 may be affected. Therefore, the first conductive structure 120 of the present embodiment shall satisfy the following: a minimum area of a cross section along a direction perpendicular to a transmission direction of the NFC excitation current is greater than a first predetermined value. In this way, the resistance value of the first conductive structure 120 satisfies a predetermined requirement, such that the signal transmission performance of the antenna assembly 100 is not affected. It can be seen from FIG. 1, the first conductive structure 120 transmits the NFC excitation current in the direction from the first side edge 122 towards the second side edge 123 or in the direction from the second side edge 123 towards the first side edge 122. The cross section perpendicular to the trans-mission direction of the NFC excitation current may be a cross section taken along a direction P1-P1 as shown in FIG, or in other words, a cross section taken along the width direction of the first conductive structure 120. The area of the cross section of the first conductive structure 120 taken along the direction P1-P1 is an area after areas of three first gaps 121 are subtracted. The area of the cross section of the first conductive structure 120 is greater than a first predetermined value, which is a predetermined value. The first predetermined value allows the resistance value of the first conductive structure 120 to meet the predetermined requirements.

When the more than one first gaps 121 are not arranged side by side as shown in FIG. 1, such as shown in FIG. 3 where the more than one first gaps 121 are misaligned with each other, the minimum area of the cross section of the first conductive structure 120 along the direction perpendicular to the transmission direction of the NFC excitation current is the portion of the first gap 121 that occupies a largest area. For example, when the area occupied by the first gaps 121 at the position P2-P2 is the largest, the minimum area of the cross section of the first conductive structure 120 along the direction perpendicular to the transmission direction of the NFC excitation current is an area of the cross section of the first conductive structure 120 taken along P2-P2. It shall be understood that the first conductive structure 120) has a plurality of cross sections in the width direction of the first conductive structure 120. The area of each of the plurality of cross sections in the width direction may be calculated, a smallest area may be selected from all calculated areas, and the area of the smallest cross section shall be greater than the first predetermined value.

Figure 6:
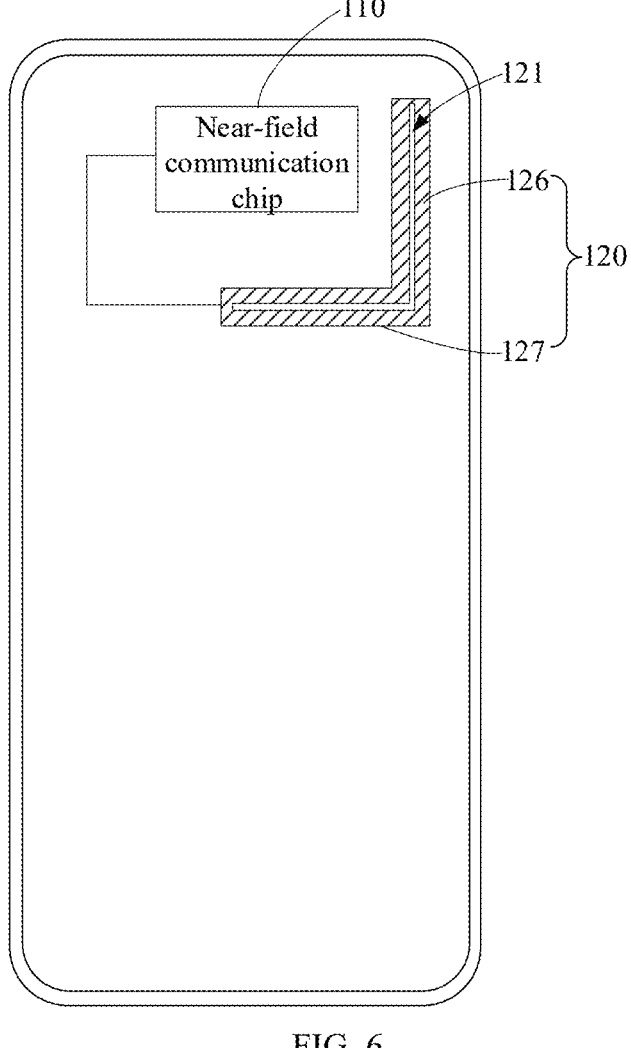
FIG. 6 is a second structural schematic view of an antenna assembly according to an embodiment of the present disclosure.

To be noted that, shapes of the first conductive structures 120 shown in FIGS. 1 to 5 are only exemplary. The first conductive structure 120 is not limited to be rectangular plate-shaped. The first conductive structure 120 may alternatively be in other shapes. For example, an orthographic projection of the first conductive structure 120 may be L-like shaped. For example, as shown in FIG. 6, FIG. 6 is a second structural schematic view of the antenna assembly according to an embodiment of the present disclosure. The first conductive structure 120 may include a first portion 126 and a second portion 127. The second portion 127 is bent with respect to the first portion 126, such that the first conductive structure 120 is configured to be "L"-like shaped. The "L"-like shape refers to a shape substantially similar to the letter "L". As shown in FIG. 6, the first conductive structure 120 may include the first side edge 122, the second side edge 123, the third side edge 124, and the fourth side edge 125. The first side edge 122 is opposite to the second side edge 123. The third side edge 124 is connected between an end of the first side edge 122 and an end of the second side edge 123. The fourth side edge 125 is connected between the other end of the first side edge 122 and the other end of the second side edge 123. The more than one first gaps 121 are aligned with each other near the third side edge 124. The edge of each first gap 121 near the third side edge 124 is in a distance of a first predetermined distance d1 away from the third side edge 124. The more than one first gaps 121 are aligned with each other near the fourth side edge 125. The edge of each first gap 121 near the fourth side edge 125 is in a distance of a second predetermined distance d2 away from the fourth side edge 125. More details may be referred to the description of the first predetermined distance d1 and the second predetermined distance d2 for FIG. 1, and will not be repeated herein.

Each of the first portion 126 and the second portion 127 may define a plurality of first gaps 121. The number of first gaps 121a in the first portion 126 is the same as the number of first gaps 121b in the second portion 127, such as being three. One of the first gaps 121a in the first portion 126 is communicated with one of the first gaps 121b in the second portion 127. For example, as shown in FIG. 6, the first gap

121a in the first portion 126 is communicated with the first gap 121b in the second portion at a corresponding position. The first gap 121a in the first column is communicated to the first gap 121b in the first column. The first gap 121a in the second column is communicated to the first gap 121b in the second column. The first gap 121a in the third column is communicated to the first gap 121b in the third column. Of course, the first gap 121a in the first portion 126 may alternatively be communicated to the first gap 121b at other locations of the second portion 127. For example, the first gap 121a of the first column is communicated to the first gap 121b of the second column.

To be noted that, the first gap 121a of the first portion 126 may not be communicated to the first gap 121b of the second portion 127: or some of the first gaps 121a of the first portion 126 may not be communicated to some of the first gaps 121b of the second portion 127, and another some of the first gaps 121a of the first portion 126 may be communicated to another some of the first gaps 121b of the second portion 127.

The first conductive structure 120 is a printed circuit on a flexible printed circuit board (FPC). It shall be understood that in the present embodiment, the FPC may serve as a radiator for transmitting the NFC signals. In the art, the FPC is usually an enclosed sheet structure, or in other words, the FPC does not define any through hole or gap. When the FPC is conducted, since the wires on the flexible circuit board are usually metal, a magnetic field generated by the metal wires cannot penetrate the wires on the FPC (or in other words, magnetic lines are not distributed at locations where the wires are arranged, which does not contribute to the magnetic flux). The magnetic field generated by the wires can only be radiated to the outside from two side edges of the FPC, such that a radiation area and a radiation intensity of the FPC may be limited. In the present disclosure, one or more first gaps 121 are defined in the printed circuit of the FPC, such that the magnetic field generated by the FPC can penetrate the printed circuit of the FPC through the first gaps 121, and in this way, the printed circuit itself has magnetic lines distributed, contributing to the magnetic flux. Compared to the art, in the present disclosure, the total magnetic flux of the magnetic field radiated by the FPC may be increased, the radiated area that the antenna assembly 100 transmits the FNC signals is effectively increased, and the radiation performance of the antenna assembly 100 may be improved.

In the present embodiment, the first conductive structure 120 may be a metal sheet. For example, the first conductive structure 120 may be a steel sheet that defines one or more first gaps 121. When the steel sheet is conducted, or when the NFC excitation current is being transmitted, the steel sheet can generate the magnetic field, and the magnetic field generated by the steel sheet may be radiated to the outside through the first gaps 121. To be noted that, the first conductive structure 120 may alternatively be an object other than the printed circuit or the metal sheet of the flexible circuit board and may serve as a radiator.

Figure 7:
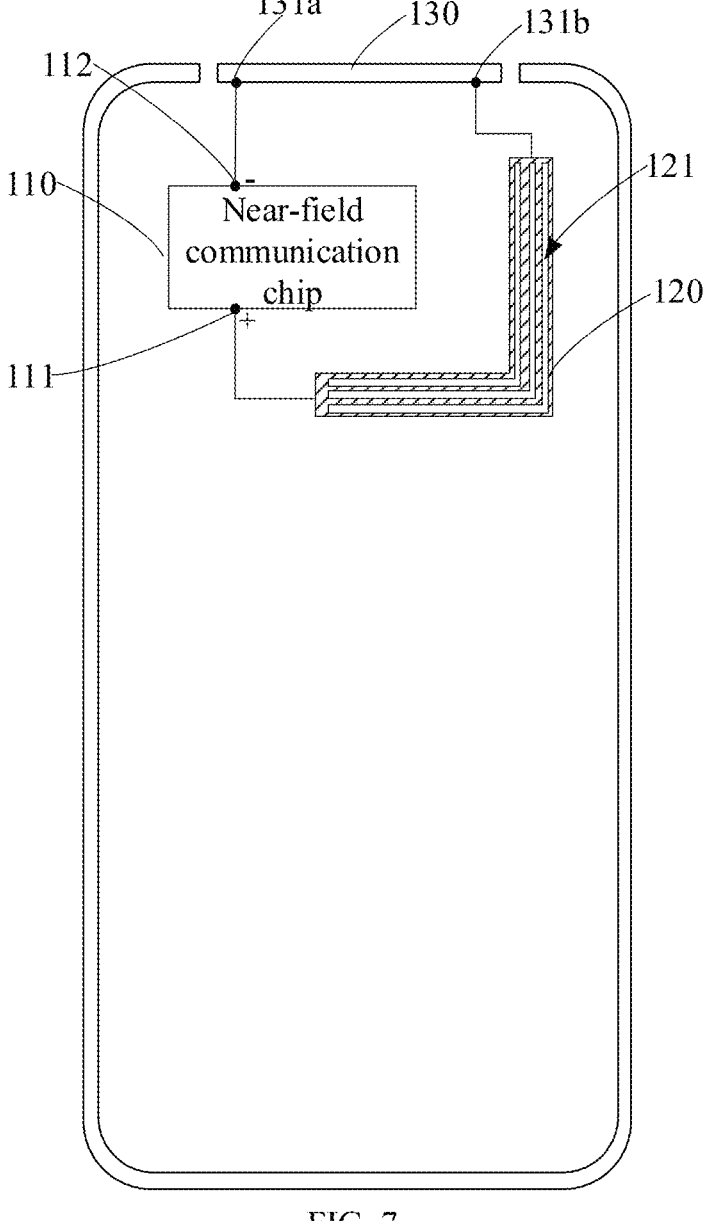
FIG. 7 is a third structural schematic view of an antenna assembly according to an embodiment of the present disclosure.

As shown in FIG. 7. FIG. 7 is a third structural schematic view of the antenna assembly according to an embodiment of the present disclosure. In the present embodiment, the antenna assembly 100 may further include a second conductive structure 130, the second conductive structure 130 is arranged with a first feed end 131a and a connection end 131b. The connection end 131b is spaced apart from the first feed end 131a. The first feed end 131a is electrically connected to the NFC chip 110. The connection end 131b is electrically connected to the first conductive structure 120.

The second conductive structure 130 is configured to transmit the NFC excitation current cooperatively with the first conductive structure 120. The NFC chip 110 may be configured to provide the differential excitation current. For example, the NFC chip 110 includes a first differential signal end 111 and a second differential signal end 112. For example, the first differential signal end 111 may be a positive port of the NFC chip 110, and the second differential signal end 112 may be a negative port of the NFC chip 110. The first differential signal end 111 and the second differential signal end 112 are configured to provide differential excitation currents. For example, the differential excitation currents provided by the NFC chip 110 may be input to the antenna assembly 100 via the first differential signal end 111 and returned to the NFC chip 110 via the second differential signal end 112, such that a current circuit is formed. It shall be understood that the NFC chip 110, the first conductive structure 120, and the second conductive structure 130 may form a conductive circuit for transmitting the NFC excitation current. That is, the NFC excitation current is output from the first differential signal end 111 of the NFC chip 110 and is subsequently fed into the first conductive structure 120. Further, the NFC excitation current is transferred via the first conductive structure 120 to the second conductive structure 130, and is subsequently returned via the second conductive structure 130 to the second differential signal end 112 of the NFC chip 110. In this way, a complete conductive circuit is formed.

It shall be understood that when the conductive circuit is transmitting the NFC excitation current, the first conductive structure 120 and the second conductive structure 130) may cooperatively generate an alternating magnetic field, such that the NFC signal may be radiated to the outside to achieve NFC of the electronic device 20. In a process of radiating the NFC signal to the outside, a part of the NFC signal may be radiated to the outside through the first gap 121 in the first conductive structure 120. Compared to not conductive structure that does not define any first gap 121, in the embodiment of the present disclosure, the radiation intensity that the antenna assembly 100 radiates the NFC signals is increased, such that the signal transmission performance of the antenna assembly 100 may be improved.

Figure 8:
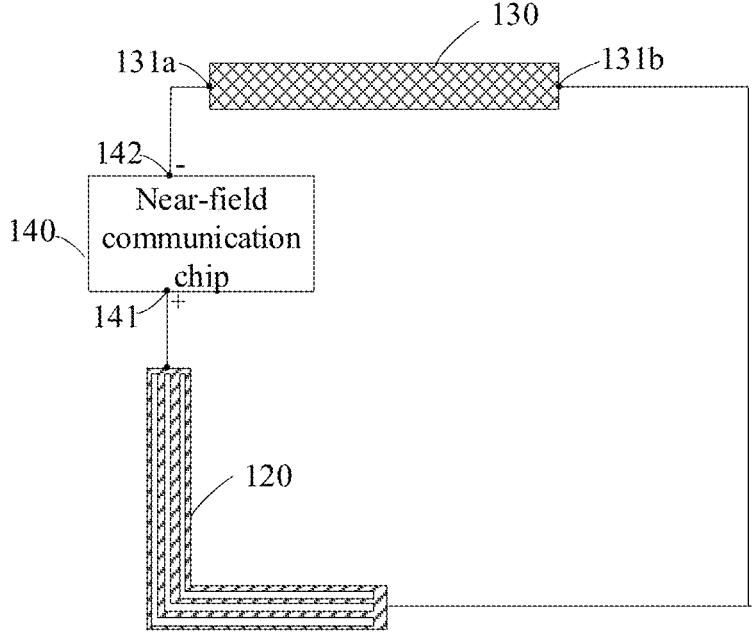
FIG. 8 is a fourth structural schematic view of an antenna assembly according to an embodiment of the present disclosure.

To be noted that, positional relationships between the NFC chip 110, the first conductive structure 120, the second conductive structure 130, and the ground plane 140 is not limited herein. For example, as shown in FIG. 8, FIG. 8 is a fourth structural schematic view of the antenna assembly according to an embodiment of the present disclosure. The first conductive structure 120 may alternatively be disposed on the other side of the second conductive structure 130. For example, the first conductive structure 120 may be disposed on a left side of the second conductive structure 130. In this case, a bending direction formed by the first portion 126 and the second portion 127 of the first conductive structure 120 may be opposite to the bending direction shown in FIG. 6.

It shall be understood that the first conductive structure 120 of the present disclosure may be arranged based on an internal space of the electronic device 20, as long as the NFC chip 110, the first conductive structure 120, and the second conductive structure 130 can form the conductive circuit.

Figure 9:
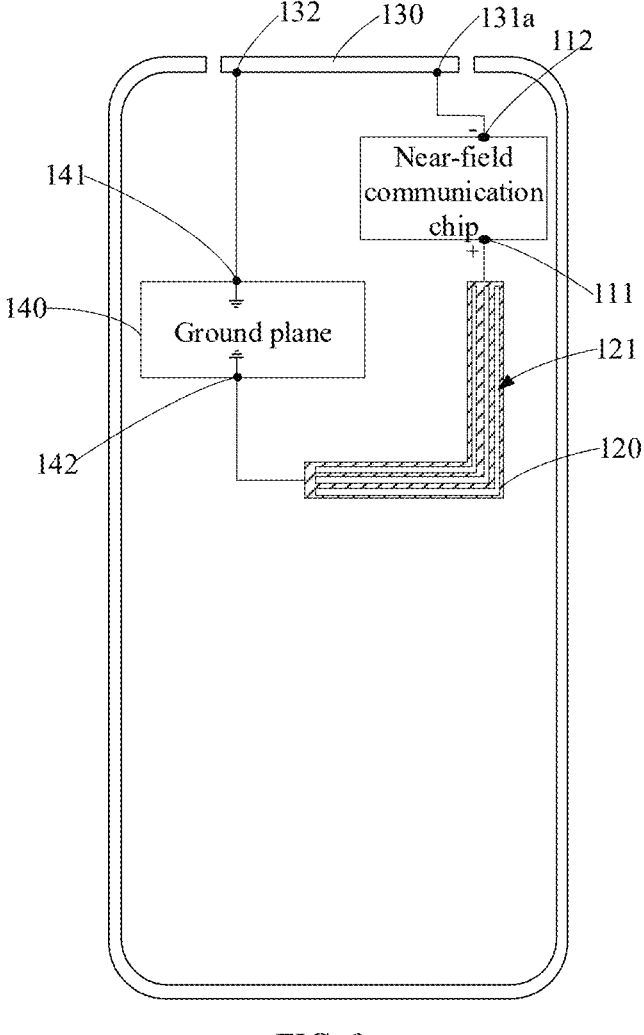
FIG. 9 is a fifth structural schematic view of an antenna assembly according to an embodiment of the present disclosure.
Figure 10:
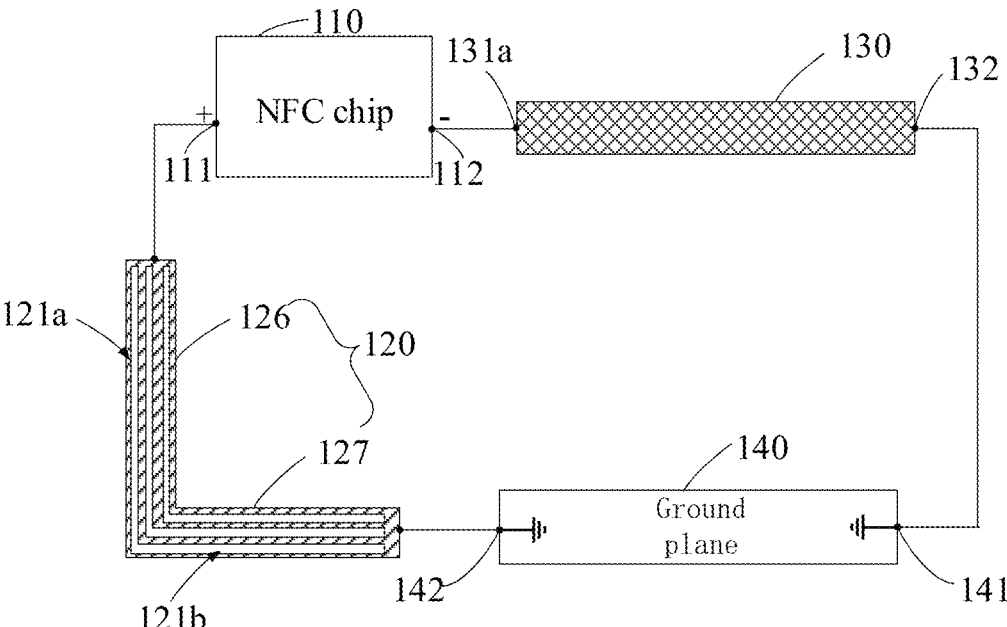
FIG. 10 is a sixth structural schematic view of an antenna assembly according to an embodiment of the present disclosure.

To be noted that, the connection relationship among the NFC chip 110, the first conductive structure 120, and the second conductive structure 130 is not limited herein, such as shown in FIG. 9 and FIG. 10, FIG. 9 is a fifth structural schematic view of the antenna assembly according to an embodiment of the present disclosure; and FIG. 10 is a sixth structural schematic view of the antenna assembly according to an embodiment of the present disclosure.

The antenna assembly 100 further includes the ground plane 140. The ground plane 140 is configured to form a common ground. The ground plane 140 may be formed by a conductor, a printed circuit or a metallic printed layer in the electronic device. For example, the ground plane 140 may be formed on a main circuit board of the electronic device. To be noted that the ground plane 140 may alternatively be formed on a shell of the electronic device. For example, the ground plane 140 may be formed through a substrate of a middle frame of the shell or through a battery cover (or a rear cover) of the shell.

The second conductive structure 130 is arranged with a first ground end 132. The first ground end 132 is electrically connected to the ground plane 140 to allow the second conductive structure 130 to be connected to the ground, and the performance of the second conductive structure 130 transmitting the NFC signals is further improved.

The ground plane 140 includes a first ground point 141 and a second ground point 142. The first ground point 141 and the second ground point 142 may be ends of the ground plane 140, or protruding structures on the ground plane 140, or pads formed on the ground plane 140, or regions of certain areas on the ground plane 140, and so on.

A conductive path of the ground plane 140 may be formed between the first ground point 141 and the second ground point 142. The conductive path may be configured to conduct a current. That is, when a voltage signal is applied to the first ground point 141 and the second ground point 142, a current may be generated between the first ground point 141 and the second ground point 142, such that a current circuit is generated. It shall be understood that when the NFC chip 110 provides the differential excitation current, the conductive path between the first ground point 141 and the second ground point 142 may be configured to transmit the NFC current signal provided by the NFC chip.

The first conductive structure 120 is electrically connected to the first differential signal end 11, enabling the first differential signal end 111 to feed power to the first conductive structure 120. For example, the differential excitation current provided by the NFC chip 110 may be transmitted to the first conductive structure 120 via the first differential signal end 111, such that feeding to the first conductive structure 120 may be achieved. The first conductive structure 120 is arranged with a second ground end 128. The second ground end 128 is electrically connected to the first ground point 141 of the ground plane 140 to allow the first conductive structure 120 to be connected to the ground.

The first feed end 131a of the second conductive structure 130 is electrically connected to the second differential signal end 112, enabling the second differential signal end 112 to feed power to the first feed end 131a. For example, the differential excitation current provided by the NFC chip 110 may be transmitted to the second differential signal end 112 via the first feed end 131a, such that the power may be fed to the second conductive structure 130. The first ground end 132 of the second conductive structure 130 is electrically connected to the second ground point 142 of the ground plane 140, enabling the second conductive structure to be connected to the ground.

The conductive path may be formed the first ground point 141 and the second ground point 142 of the ground plane 140. The conductive path may be configured to conduct a current. That is, when a voltage signal is applied to the first ground end 132 and the second ground end 128, a current may be generated between the first ground end 132 and the second ground end 128, such that a current circuit is generated. It shall be understood that when the NFC chip 110 provides the NFC excitation current, the conductive path between the first ground end 132 and the second ground end 128 may be configured to transmit the differential excitation current.

When the antenna assembly 100 transmits the differential excitation current provided by the NFC chip 110, the first conductive structure 120, the conductive path on the ground plane 140, and the second conductive structure 130 cooperatively form the conductive circuit for the transmitting the differential excitation current. That is, the NFC chip 110 is output from the first differential signal end 111 of the NFC chip 110, fed into the first conductive structure 120, transmitted to the conductive path on the ground plane 140 through the first conductive structure 120, transmitted to the second conductive structure 130 through the conductive path, and eventually returned to the second differential signal end 112 of the NFC chip through the second conductive structure 130, such that a complete conductive circuit is formed.

It shall be understood that when the conductive circuit is transmitting the NFC excitation current, the first conductive structure 120, the conductive path on the ground plane 140, and the second conductive structure 130 may cooperatively generate an alternating magnetic field, such that the NFC signal is radiated to the outside, achieving the NFC of the electronic device.

In the present embodiment, when the antenna assembly 100 is transmitting the NFC excitation current, the first conductive structure 120 may generate a first NFC radiation field. The first NFC radiation field may cover a space around the electronic device. The second conductive structure 130) may generate a second NFC radiation field. The second NFC radiation field may cover a space around the electronic device. The second NFC radiation field at least partially overlaps with the first NFC radiation field, such that the area of the NFC radiation field around the electronic device may be increased, and a strength of the overlapped field may be improved. Therefore, an effective read/write (swipe) area of the NFC antenna of the electronic device may be increased, and the stability that the NFC antenna of the electronic device is reading/writing (swiping) may be improved.

In addition, when the antenna assembly 100 is transmitting the NFC excitation current, the ground plane 140 may generate a third NFC radiation field. The third NFC radiation field may cover a space around the electronic device. The third NFC radiation field at least partially overlaps with the first NFC radiation field, and at least partially overlaps with the second NFC radiation field. Therefore, the area of the NFC radiation field around the electronic device may be increased, and the strength of the overlapped field may be improved.

For example, in practical, when a NFC receiver (such as an underground card machine) is near the first conductive structure 120 and reads the NFC signal, the first NFC radiation field formed by the first conductive structure 120 serves as a main radiation field, the second NFC radiation field formed by the second conductive structure 130 and the third NFC radiation field formed by the ground plane 140 may compensate the main radiation field. In this way, a location in the main radiation field where a field strength is weak may be compensated, and the field strength of the entire main radiation field may be improved. Similarly, when the NFC receiver is near the second conductive structure 130 to read the NFC signal, the second NFC radiation field formed by the second conductive structure

130 serves as the main radiation field, and the first NFC radiation field and the third NFC radiation field may both compensate for the main radiation field.

Therefore, for the antenna assembly 100 of the present disclosure, the NFC signals may be sent and received at anywhere of the NFC radiation field formed by the first conductive structure 120, the second conductive structure 130, and the ground plane 140 of the electronic device, enabling the electronic device of the present disclosure to be communicated with other electronic devices via NFC.

Figure 11:
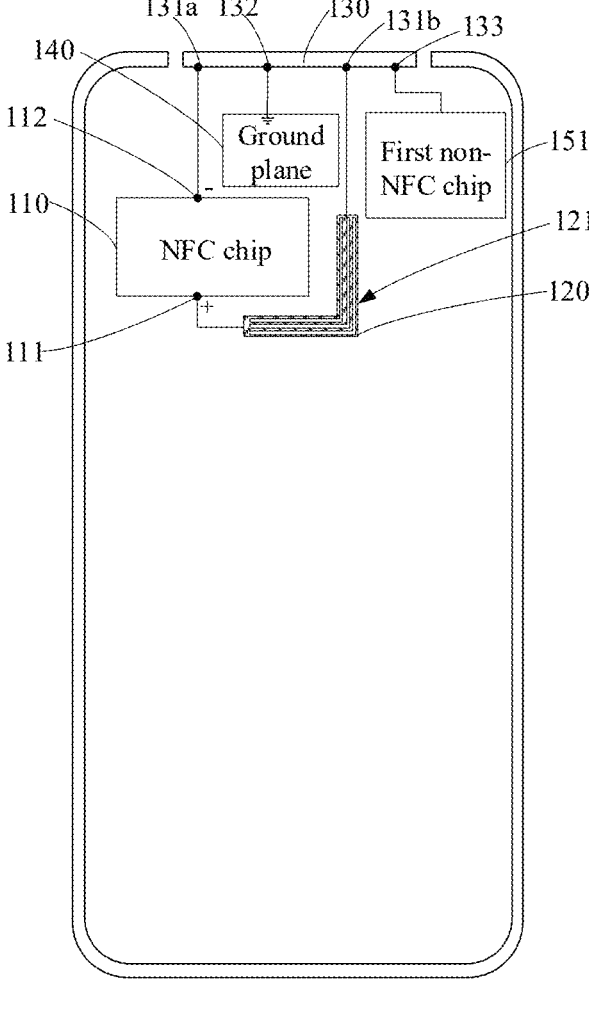
FIG. 11 is a seventh structural schematic view of an antenna assembly according to an embodiment of the present disclosure.

In the present embodiment, in addition to forming the second NFC radiation field and transmitting the NFC signal, the second conductive structure 130 of the present embodiment may further be configured to transmit a non-NFC signal. Exemplarily, as shown in FIG. 11. FIG. 11 is a seventh structural schematic view of the antenna assembly according to an embodiment of the present disclosure. The antenna assembly 100 further includes a first non-NFC chip 151. The first non-NFC chip 151 may be an IC chip. The first non-NFC chip 151 may be configured to provide a first non-NFC excitation current. The second conductive structure 130 is further arranged with a second feed end 133 spaced apart from the first feed end 131*a*. The second feed end 133 may be electrically connected to the first non-NFC chip 151. In this way, the second conductive structure 130 may also be configured to transmit the first non-NFC excitation current. It shall be understood that the first non-NFC excitation current provided by the first non-NFC chip 151 is fed to the second feed end 133 and returned to the ground from the first ground end 132, such that the first non-NFC excitation current is transmitted.

The first non-NFC excitation current may be the unbalanced signal, including but is not limited to a cellular network signal, a Wireless Fidelity (Wi-Fi) signal, a Global Positioning System (GPS) signal, a Bluetooth (BT) signal. Accordingly, the first non-NFC chip 151 may be a cellular communication chip configured to provide the cellular network signal: the first non-NFC chip 151 may be a Wi-Fi chip configured to provide the Wi-Fi signal: the first non-NFC chip 151 may be a GPS chip configured to provide the GPS signal: the first non-NFC chip 151 may be a BT chip configured to provide the BT signal.

It shall be understood that the second feed end 133 is spaced apart from the first feed end 131*a*, the connection end 131*b*, and the first ground end 132. The second feed end 133 is electrically connected to the first non-NFC chip 151. The first non-NFC chip 151 may feed the first non-NFC excitation current to the second conductive structure 130 via the second feed end 133, such that the second conductive structure 130 is further configured to transmit the first non-NFC excitation current.

According to the antenna assembly 100 of the present embodiment, the second conductive structure 130 may be configured to transmit both the near-NFC excitation current signal provided by the NFC chip 110 and the first non-NFC excitation current provided by the first non-NFC chip 151. In this way, the second conductive structure 130 may be multiplexed, the number of antennas in the antenna assembly 100 configured to transmit wireless signals may be reduced, and the space of the electronic device occupied by the antenna assembly 100 may be reduced.

To be noted that, a frequency of the NFC signal is usually 13.56 MHz (mega hertz). A frequency of cellular network signal is usually above 0 MHz, a frequency of the Wi-Fi signal is usually 2.4 GHZ (gigahertz) or 5 GHZ, a frequency of the GPS signal usually includes several bands such as 1.575 GHz, 1.7 GHZ, 1.381 GHZ, 1.842 GHZ, and so on, and a frequency of the BT signal is usually 2.4 GHZ. Therefore, the NFC signal is a low frequency signal compared to the cellular network signal, the Wi-Fi signal, the GPS signal and the BT signal. Alternatively, it shall be understood that the NFC signal is a low frequency signal, the non-NFC excitation current is a high frequency signal, and the frequency of the NFC signal is less than the frequency of the non-NFC excitation signal.

In addition, to be noted that, when the wireless signal is being transmitted, as the frequency of the wireless signal is reduced, a length of the radiator is increased accordingly. As the frequency of the wireless signal is increased, the length of the radiator is decreased accordingly. That is, the length of the radiator required to transmit the NFC signal is greater than the length of the radiator required to transmit the non-NFC excitation current.

Therefore, in order to reduce the overall length of the second conductive structure 130, the second feed end 133 and the first feed end 131*a* may be arranged on different sides of the first ground end 132. That is, the first ground end 132 is disposed between the second feed end 133 and the first feed end 131*a*. Compared to arranging the second feed end 133 and the first feed end 131*a* on a same side of the first ground end 132, the second feed end 133 and the first feed end 131*a* being arranged on different sides of the first ground end 132 may allow a portion between the first feed end 131*a* and the first ground end 132 to be multiplexed, such that the overall length of the second conductive structure 130 may be reduced.

Figure 12:
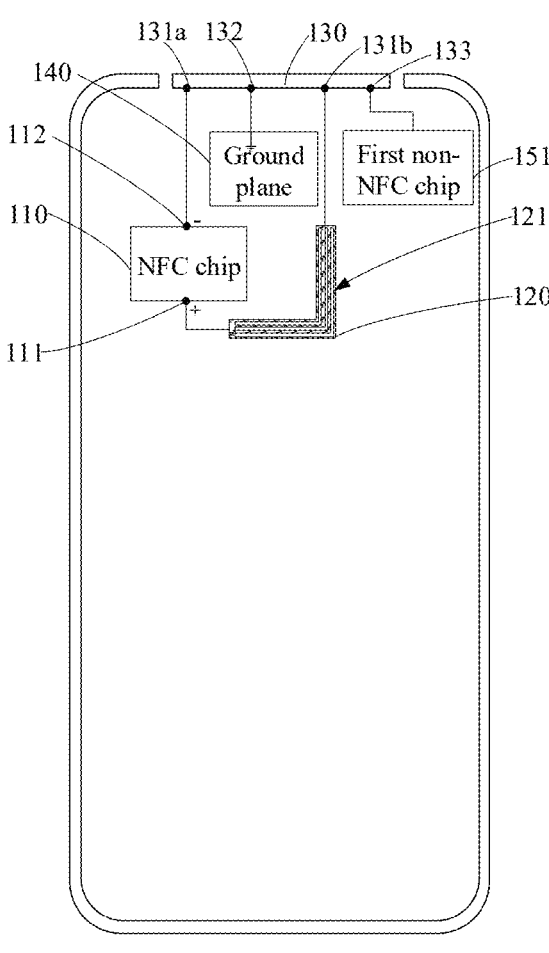
FIG. 12 is an eighth structural schematic view of an antenna assembly according to an embodiment of the present disclosure.

As shown in FIG. 12, FIG. 12 is an eighth structural schematic view of the antenna assembly according to an embodiment of the present disclosure. The second conductive structure 130 defines one or more second gaps 134. For example, the second conductive structure 130 may define one second gap 134, two second gaps 134, three second gaps 134, five second gaps 134 or other numbers of second gaps 134. When the second conductive structure 130 transmits the NFC excitation current, the second conductive structure 130 may generate the magnetic field when being conducted, the magnetic field generated by the second conductive structure 130 may be radiated to the outside through the second gap 134.

In the present embodiment, the number of second gaps 134 may be more than one. For example, the number of second gaps 134 may be three, and the three second gaps 134 may be arranged in an array. For example, as shown in FIG. 11, the second conductive structure 130 may be rectangular plate-shaped. The second conductive structure 130 may include a fifth side edge 135, a sixth side edge 136, a seventh side edge 137, and an eighth side edge 138. The fifth side edge 135 is opposite to the sixth side edge 136. The seventh side edge 137 is opposite to the eighth side edge 138. The seventh side edge 137 is connected between an end of the fifth side edge 135 and an end of the sixth side edge 136. The eighth side edge 138 is connected between the other end of the fifth side edge 135 and the other end of the sixth side edge 136. The three second gaps 134 may be located along a direction from the fifth side edge 135 towards the sixth side edge 136. It shall be understood that the three second gaps 134 may be arranged successively along a width direction of the second conductive structure 130.

To be noted that, in the description of the present disclosure, terms such as "fifth", "sixth", "seventh", "eighth", and so on, are used only to distinguish similar objects and shall not be interpreted as indicating or implying relative importance or implicitly specifying the number of an indicated technical feature. For example, the fifth side edge 135 may alternatively be a side edge located at a right of the second conductive structure 130, and the seventh side edge 137 may alternatively be a side edge located at a bottom of the second conductive structure 130.

In the present embodiment, the more than one second gaps 134 may be arranged successively along the length direction of the second conductive structure 130. For example, the three second gaps 134 may alternatively be arranged successively along a direction from the seventh side edge 137 towards the eighth side edge 138.

In some embodiments, the more than one second gaps 134 may alternatively be arranged successively along other directions of the second conductive structure 130. For example, the second gaps 134 may be arranged in a diagonal direction of the second conductive structure 130 or a direction of any other angles, such as 60°, or 75°, or 120°, and so on.

The more than one second gaps 134 of the present embodiment may be misaligned with each other. Details may be referred to the description about the first conductive structure 120, and will not be repeated.

To be noted that, in the present embodiment, a part of the more than one second gaps 134 may be arranged in an array, and a part of the more than one second gaps 134 may be misaligned with each other. Details may be referred to the description about the first conductive structure 120, and will not be repeated.

In the present embodiment, the more than one second gaps 134 may have a same shape. For example, an orthographic projection of each of the more than one second gaps 134 is rectangular (such as shown in FIG. 12), or squared, or triangular, and so on. Alternatively, the more than one second gaps 134 may have different shapes, or some of the more than one second gaps 134 may have different shapes. For example, orthographic projections of some of the more than one second gaps 134 are rectangular, and orthographic projections of some of the more than one second gaps 134 are triangular.

The more than one second gaps 134 may have a same size. Of course, more than one second gaps 134 may have different sizes, or some of the more than one second gaps 134 may have different sizes. All of the more than one second gaps 134 may have a same shape and a same size: or shapes and sizes of all of the more than one second gaps 134 are different from each other: or shapes and sizes of some of the more than one second gaps 134 are different from each other. Details may be referred to the description about the first conductive structure 120, and will not be repeated.

According to the formula $RI=\rho L/S2$, the $\rho$ represents a resistivity of a resistor and is determined by the nature of the resistor, the L represents a length of the resistor, the S2 represents a cross-sectional area of the second conductive structure 130. It can be known that when the cross-sectional area of the second conductive structure 130 is reduced, a resistance value of the second conductive structure 130 may be increased. In this case, the signal transmission performance of the antenna assembly 100 may be affected. Therefore, the second conductive structure 130 of the present embodiment shall satisfy the following: a minimum area of a cross section along a transmission direction of the NFC excitation current is greater than a second predetermined value. In this way, the resistance value of the second conductive structure 130 satisfies a predetermined requirement, such that the signal transmission performance of the antenna assembly 100 is not affected. It can be seen from FIG. 12, the second conductive structure 130) transmits the NFC excitation current in the direction from the fifth side edge 135 towards the sixth side edge 136 or in the direction from the sixth side edge 136 towards the fifth side edge 135. The cross section perpendicular to the transmission direction of the NFC excitation current may be a cross section taken along a direction P3-P3 as shown in FIG. 11, or in other words, a cross section taken along the width direction of the first conductive structure 120. The area of the cross section of the second conductive structure 130 taken along the direction P3-P3 is an area after areas of the two second gaps 134 are subtracted. The area of the cross section of the second conductive structure 130 is greater than a second predetermined value, which is a predetermined value. The second predetermined value allows the resistance value of the second conductive structure 130 to meet the predetermined requirement. When the more than one second gaps 134 are not arranged side by side as shown in FIG. 12, for example, when the more than one second gaps 134 are misaligned with each other, the minimum area of the cross section of the second conductive structure 130) along the direction perpendicular to the transmission direction of the NFC excitation current is the portion of the second gap 134 that occupies a largest area. Details may be referred to the description about the first conductive structure 120, and will not be repeated. It shall be understood that the second conductive structure 130 has a plurality of cross sections in the width direction of the second conductive structure 130. The area of each of the plurality of cross sections in the width direction may be calculated, a smallest area may be selected from all calculated areas, and the area of the smallest cross section shall be greater than the second predetermined value.

A size and a shape of the second gap 134 in the present embodiment may be the same as or different from a size and a shape of the first gap 121.

A structure of the second conductive structure 130 in the present embodiment may be the same as a structure of the first conductive structure 120. For example, the second conductive structure 130 and the first conductive structure 120 are both rectangular plate-shaped. Of course, the structure of the second conductive structure 130 in the present embodiment may be different from the structure of the first conductive structure 120, such as shapes are different, and/or sizes are different.

Figure 13:
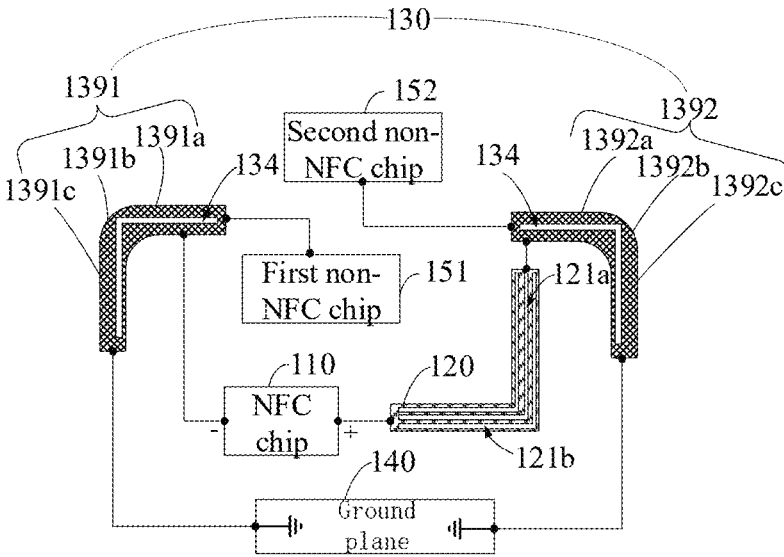
FIG. 13 is a ninth structural schematic view of an antenna assembly according to an embodiment of the present disclosure.

To be noted that, the shape of the second conductive structure 130 shown in FIG. 12 is only exemplary, the second conductive structure 130 is not limited to be rectangular plate-shaped. The second conductive structure 130 may be in other shapes. For example, the first conductive structure 120 of the present embodiment may include a plurality of conductive sub-structures. Exemplarily, as shown in FIG. 13, FIG. 13 is a ninth structural schematic view of the antenna assembly according to an embodiment of the present disclosure. The second conductive structure 130 may include a first conductive sub-structure 1391 and a second conductive sub-structure 1392 spaced apart from the first conductive sub-structure 1391.

The first signal end of the NFC chip 110 is electrically connected to the feed end of the first conductive structure 120. The second signal end of the NFC chip 110 is electrically connected to the feed end of the first conductive sub-structure 1391. A ground end of the first conductive sub-structure 1391 is electrically connected to the ground plane 140. A feed end of the second conductive sub-structure 1392 is electrically connected to the first conductive structure 120, and the ground end of the second conductive sub-structure 1392 is electrically connected to the ground plane.

When the antenna assembly 100 transmits the NFC excitation current provided by the NFC chip 110, the first conductive structure 120, the first conductive sub-structure 1391, the conductive path on the ground plane 140, and the second conductive sub-structure 1392 cooperatively form a conductive circuit for transmitting the NFC excitation current. That is, the NFC chip 110 outputs the current from one of the signal ends of the NFC chip 110, and the current is fed into the first conductive structure 120. The first conductive structure 120 transmits the current to the second conductive sub-structure 1392 and further to the conductive path on the ground plane 140 via the second conductive sub-structure 1392. Subsequently, the current is transmitted to the first conductive sub-structure 1391 via the conductive path on the ground plane 140 and is eventually returned to the other signal end of the NFC chip 110 through the first conductive sub-structure 1391. In this way, a complete conductive circuit is formed.

It shall be understood that when the conductive circuit is transmitting the NFC excitation current, the first conductive structure 120, the conductive path on the ground plane 140, the first conductive sub-structure 1391, and the second conductive sub-structure may cooperatively generate the alternating magnetic field to radiate the NFC signal to the outside to achieve the NFC of the electronic device.

As shown in FIG. 13, The first conductive sub-structure 1391 may include a first straight portion 1391a, a first bent portion 1391b, and a second straight portion 1391c, which are connected successively. The first bent portion 1391b is bent with respect to both the first straight portion 1391a and the second straight portion 1391c. To be noted that the structure of the first conductive sub-structure 1391 is not limited herein. The first conductive sub-structure 1391 may also be in other shapes. For example, the first conductive sub-structure may be configured based on a configuration of the electronic device, which will not be limited herein.

The structure of the second conductive sub-structure 1392 may be the same as the structure of the first conductive sub-structure 1391. For example, the second conductive sub-structure 1392 may include a third straight portion 1392a, a second bent portion 1392b, and a fourth straight portion 1392c, which are connected successively. The second bent portion 1392b is bent with respect to both the third straight portion 1392a and the fourth straight portion 1392c. The structure of the second conductive sub-structure 1392 may also be different from the structure of the first conductive sub-structure 1391, for example, the second conductive sub-structure 1392 may be rectangular.

The first conductive sub-structure 1391 may be electrically connected to the first non-NFC chip 151, such that the first conductive sub-structure 1391 may transmit both the NFC signal and the first non-NFC signal to allow the first conductive sub-structure 1391 to be multiplexed.

The antenna assembly 100 may further include a second non-NFC chip 152. The second non-NFC chip 152 may be configured to provide a second non-NFC excitation current. The second conductive sub-structure 1392 may be electrically connected to the second non-NFC chip 152, such that the second conductive sub-structure 1392 may transmit the NFC signal and the second non-NFC signal, enabling the second conductive sub-structure 1392 to be multiplexed. A type of the second non-NFC signal transmitted by the second conductive sub-structure 1392 may be the same as a type of the first NFC communication signal transmitted by the first conductive sub-structure 1391, such as both be the cellular signals. The two non-NFC signals may be different.

Of course, only one of the first conductive sub-structure and the second conductive sub-structure may be multiplexed.

To be noted that, the first conductive sub-structure and the second conductive sub-structure shown in FIG. 13 are only exemplary. The first conductive sub-structure and/or the second conductive sub-structure may not define any second gap. The first conductive sub-structure and/or may not be connected to the non-NFC chip and is configured to transmit the NFC signals only.

In the above embodiments, a method of configuring the second conductive structure 130 may be the same as a method of configuring the first conductive structure 120. For example, the second conductive structure 130 may also be the FPC. For example, the second conductive structure 130 may be formed by metal wires on the FPC of the electronic device. The FPC may be a FPC for a display, a FPC for a camera, a FPC for a motor, and so on. Of course, the method of configuring the second conductive structure 130 may be the same as the method of configuring the first conductive structure 120. For example, the second conductive structure 130 may be formed by a metal structure in the electronic device. For example, a gap may be defined in a frame of the shell. A metal branch may be formed through the seam, and the metal branch may form the second conductive structure 130. In this way, the second conductive structure 130 may be formed based on the middle frame, ensuring that the NFC antenna has sufficient headroom in the electronic device to improve the stability of the NFC signal. Furthermore, when the conductive structures at different locations of the middle frame are connected via the conductive path on the ground plane 140, the length of the entire conductive circuit may be extended. In this way, the effective radiation range of the entire NFC antenna is increased. In another example, the second conductive structure 130 may be formed by a decorative ring of a camera of the electronic device.

In the above embodiments, one or more second gaps 134 are defined in the second conductive structure 130. In this way, when the antenna assembly 100 is transmitting the NFC excitation current, the magnetic field generated by the antenna assembly 100 may be transmitted to the outside through the first gap 121 and the second gap 134. Compared to defining the first gap 121 in the first conductive structure 120 only, in the above embodiments, the radiation area and the radiation intensity of the antenna assembly 100 may be further increased, and the performance of transmitting the NFC signals is further enhanced.

Figure 14:
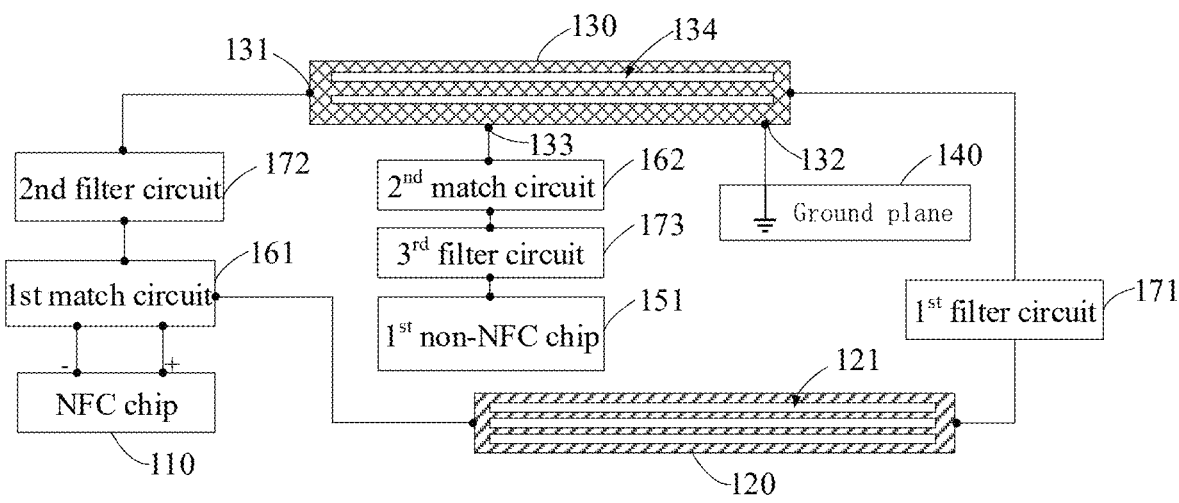
FIG. 14 is a tenth structural schematic view of an antenna assembly according to an embodiment of the present disclosure.

To further improve the radiation performance of the antenna assembly 100, the antenna assembly 100 may further include a matching circuit, which may also be referred to as a matching network, a tuning circuit, a tuning network, and so on. Exemplarily, as shown in FIG. 14, FIG. 14 is a tenth structural schematic view of the antenna assembly according to an embodiment of the present disclosure. The antenna assembly 100 may further include a first matching circuit 161 and a second matching circuit.

The first matching circuit 161 is electrically connected to the first signal end of the NFC chip 110, the second signal end of the NFC chip 110, the feed end of the first conductive structure 120, and the first feed end 131a of the second conductive structure 130. The first matching circuit 161 is configured to match an impedance generated while the conductive circuit is transmitting the NFC excitation current.

The first matching circuit 161 may include a first end, a second end, a third end, and a fourth end. The first end is electrically connected to the first signal end of the NFC chip 110, the second end is electrically connected to the second signal end of the NFC chip 110, the third end is electrically connected to the feed end of the first conductive structure 120, and the fourth end is electrically connected to the first feed end 131a of the first conductive structure 120.

The first matching circuit 161 may include a circuit, which is formed by the capacitor, the inductor, and the resistor being connected in series or in parallel in any manners. It will also be understood that the first matching circuit 161 may further include a switch for switching the circuit that is formed by the capacitor, the inductor, and the resistor being connected in series or in parallel in any manners.

The second matching circuit 162 is electrically connected to the first non-NFC chip 151 and the second feed end 133 of the second conductive structure 130. The second matching circuit 162 is configured to match an impedance generated while the second conductive structure 130 is transmitting the non-NFC excitation current.

It shall be understood that the second matching circuit 162 may also include the circuit, which is formed by the capacitor, the inductor, and the resistor being connected in series or in parallel in any manners. It is also understood that the second matching circuit 162 may further include a switch for switching the circuit that is formed by the capacitor, the inductor, and the resistor being connected in series or in parallel in any manners. A structure of the second matching circuit 162 may be the same as or different from a structure of the first matching circuit 161.

In order to filter out a clutter in the conductive circuit, the antenna assembly 100 may further include a filter circuit. The filter circuit may be referred to as a filter network. Exemplarily; the antenna assembly 100 may further include a first filter circuit 171, a second filter circuit 172, and a third filter circuit 173, as shown in FIG. 13.

The first filter circuit 171 is disposed between the first conductive structure 120 and the second conductive structure 130. The first filter circuit 171 is configured to filter out a first interference signal between the first conductive structure 120 and the second conductive structure 130. The first interfering signal is an electrical signal other than the NFC excitation current provided by the NFC chip 110. The second filter circuit 172 is disposed between the fourth end of the first matching circuit and the first feed end 131a of the second conductive structure 130. The second filter circuit 172 is configured to filter out a second interfering signal between the second signal end and the second conductive structure 130. The second interfering signal is an electrical signal other than the NFC excitation current provided by the NFC chip 110.

The first filter circuit 171 of the present embodiment may include the circuit, which is formed by the capacitor, the inductor, and the resistor being connected in series or in parallel in any manners. For example, the first filter circuit 171 can be an LC filter circuit including the capacitor and the inductor or a filter circuit in other types. A structure of the second filter circuit 172 and a structure of the third filter circuit 173 may be the same as or different from the structure of the first filter circuit 171: or one of the structure of the second filter circuit 172 and the structure of the third filter circuit 173 may be the same as the structure of the first filter circuit 171.

Figure 15:
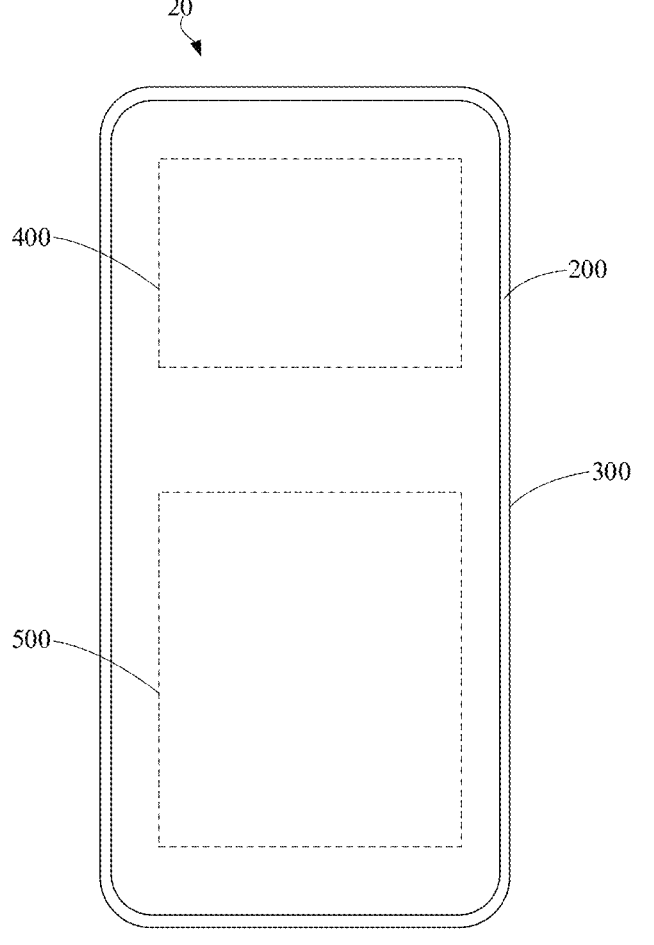
FIG. 15 is a first structural schematic view of an electronic device according to an embodiment of the present disclosure.

The present embodiment further provides an electronic device, as shown in FIG. 15. FIG. 15 is a first structural schematic view of an electronic device according to an embodiment of the present disclosure. The electronic device 20 may include the antenna assembly 100 as mentioned in the above, a middle frame 200, a rear cover 300, a main circuit board 400, and a battery 500.

Figure 16:
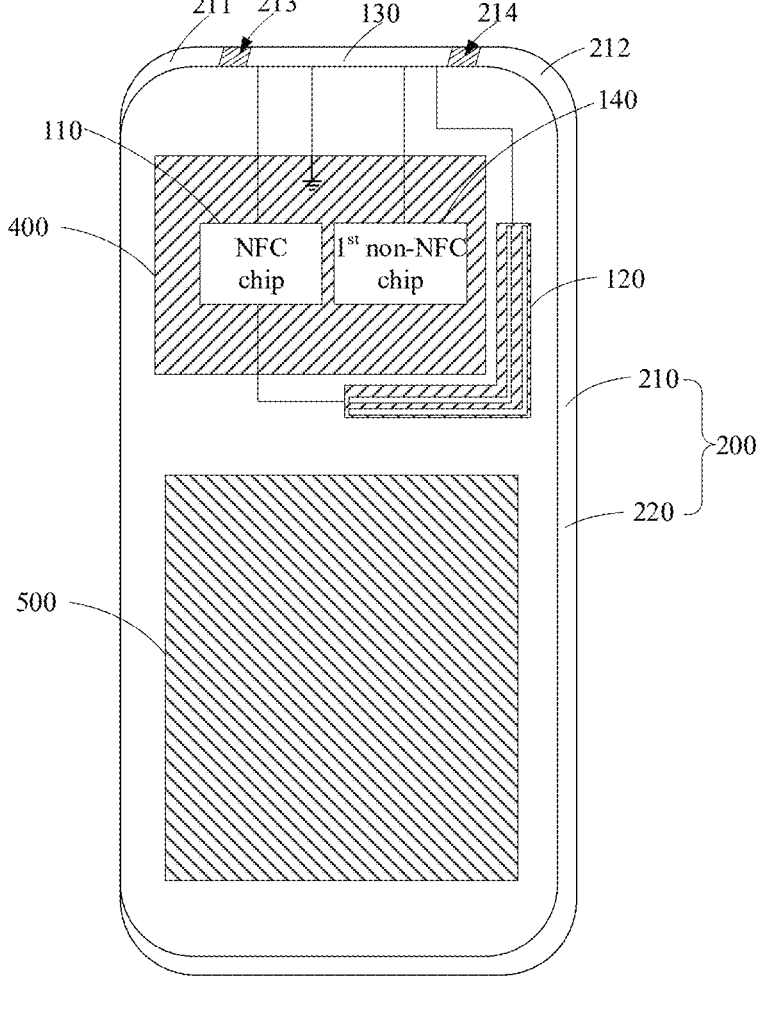
FIG. 16 is a second structural schematic view of an electronic device according to an embodiment of the present disclosure.

Combining with FIG. 16, FIG. 16 is a second structural schematic view of the electronic device according to an embodiment of the present disclosure. The middle frame 200 is a main carrying structure for carrying internal components of the electronic device 20. For example, the main circuit board 400, the battery 500, the display, and so on, are fixed on the middle frame 200. The first conductive structure 120 in the antenna assembly 100 is arranged on the middle frame 200. For example, the middle frame 200 includes a side frame 210 and a middle plate 220. Specifically, the side frame 210 is a frame structure formed by striped sides being enclosed with each other. The side frame 210 is strong enough to protect the display and other components of the electronic device 20. The middle plate 220 is a plate-shaped member. The middle plate 220 is configured to hold the first conductive structure 120, the main circuit board 400, the battery 500, the display and other components. It is understood that the first conductive structure 120 may be arranged on the middle plate 220. A position of the middle plate where the first conductive structure 120 is arranged may be determined based on arrangement of other components. For example, the first conductive structure 120 may be disposed in a gap between the main circuit board 400 and the battery 500 or in a gap between another two interconnected components of the middle plate 220, or disposed at other locations. When the first conductive structure 120 is the FPC, since the FPC is bendable, the first conductive structure 120 may be bent to be disposed in a gap between components based on positions of the components in the middle plate 220, such that the first conductive structure 120 may be arranged flexibly.

The chip and/or the circuit (such as the matching circuits, the filter circuit, and so on) in the antenna assembly 100 may be integrated on the main circuit board 400. For example, the NFC chip 110 and the first non-NFC chip 151 may both be integrated on the main circuit board 400. Of course, the NFC chip 110 and the first non-NFC chip 151 may be configured separately and electrically connected to the main circuit board 400 via electrical connection structures.

According to the antenna assembly 100 of the present embodiment, one or more first gaps 121 are defined in the first conductive structure 120, such that the radiation strength that the electronic device 20 transmits the NFC signal may be increased. In practice, as the mobile payment develops, it is becoming more and more common to take the electronic device directly as a multifunctional product for receiving payments. For example, the electronic device may be directly served as a point of sale (POS) terminal. However, in the art, the mobile terminal has a weak radiation strength. When the mobile terminal is used as the POS terminal, a response speed of the mobile terminal may be slow. In the present disclosure, the radiation area is relatively large, and the magnetic strength is strong. When the electronic device 20 is used as the POS terminal, response speed of the electronic device 20 may be fast, such that the user's experience about mobile payment may be improved.

A position in the electronic device 20 where the second conductive structure 130 is arranged may be the same as a position in the electronic device 20 where the first conductive structure 120 is arranged. For example, the second conductive structure 130 may be arranged on the middle plate 220. Of course, the position in the electronic device 20 where the second conductive structure 130 is arranged may be the different from the position in the electronic device 20 where the first conductive structure 120 is arranged. As shown in FIG. 16, the second conductive structure 130 may be arranged on the side frame 210. For example, the side frame 210) can be made of metal. In an embodiment, the side frame 210 is made of aluminum alloy. On one hand, the aluminum alloy has a better electric conductivity and a small density: enabling the weight of the electronic device 20 to be reduced. On the other hand, the aluminum alloy has good strength, providing a good protection effect on the display and other components. When forming the second conductive structure 130, seams may be defined in the side frame 210 to allow the side frame 210 to form a plurality of metal branches, and one of the plurality of metal branches is served as the second conductive structure 130. The side frame 210 is located on an outside of the electronic device 20 and forms an appearance of the electronic device 20. When a part of the side frame 210 is served as the second conductive structure 130) that can radiate the NFC signal, the second conductive structure 130 is less obscured by other components of the electronic device 20. Therefore, when the second conductive structure 130 transmits the NFC excitation current, the magnetic field generated by the second conductive structure 130 may be radiated to the outside more efficiently.

In order to further illustrate the improved performance of the antenna assembly provided by the present disclosure, the electronic device 20, which is configured with the middle frame 200 shown in FIG. 16 (wherein the first conductive structure 120 defines two first gaps 121), is tested by a testing device. As a result of the testing, the performance that the electronic device 20 of the present disclosure radiates the NFC signal is improved on the plane 0 at the inner ring of the plane 1, and at the outer ring of the plane 1. The plane 0 refers to a plane in which a testing plate of the testing device is arranged when the testing plate is tightly attached to the rear cover 300 of the electronic device 20 to perform the testing. The plane 1 refers to a plane in which a testing plate of the testing device is arranged when the testing plate is at a predetermined distance away from the rear cover 300 of the electronic device 20 to perform the testing.

Further, as shown in FIG. 16, the side frame 210 includes a third conductive structure 211 and a fourth conductive structure 212. The second conductive structure 130 is disposed between the third conductive structure 211 and the fourth conductive structure 212. A first gap 213 is defined between the third conductive structure 211 and the second conductive structure 130. A second gap 214 is defined between the fourth conductive structure 212 and the second conductive structure 130. Each of the third conductive structure 211 and the fourth conductive structure 212 may be served as the antenna radiator of the electronic device 20 and is configured to transmit a communication signal being the same as or different from the communication signal transmitted by the second conductive structure 130.

A portion of the third conductive structure 211, the second conductive structure 130, and a portion of the fourth conductive structure 212 are located at a same end of the middle frame 200. For example, the third conductive structure 211 may include a first portion, a second portion, and a third portion, which are connected with each other successively. The second portion may be bent. The first portion is disposed at a top of the middle frame 200. The second portion is disposed at an upper left corner of the middle frame 200. The third portion is disposed at a left side of the middle frame 200. The fourth conductive structure 212 may include a fourth portion, a fifth portion, and a sixth portion, which are connected to each other successively. The fifth portion is bent. The fourth portion is disposed at the top of the middle frame 200 and is spaced apart from the first portion. The second portion is disposed at an upper right corner of the middle frame 200. The sixth portion is disposed at a right side of the middle frame 200. The second conductive structure 130 may be disposed between the first portion and the fourth portion.

To be noted that, the arrangement of the third conductive structure 211, the second conductive structure 130, and the fourth conductive structure 212 is not limited by the preset disclosure. For example, a part of the third conductive structure 211, the second conductive structure 130, and a part of the fourth conductive structure 212 may alternatively be located at a bottom of the middle frame 200, or at the left side or the right side of the middle frame 200).

Figure 17:
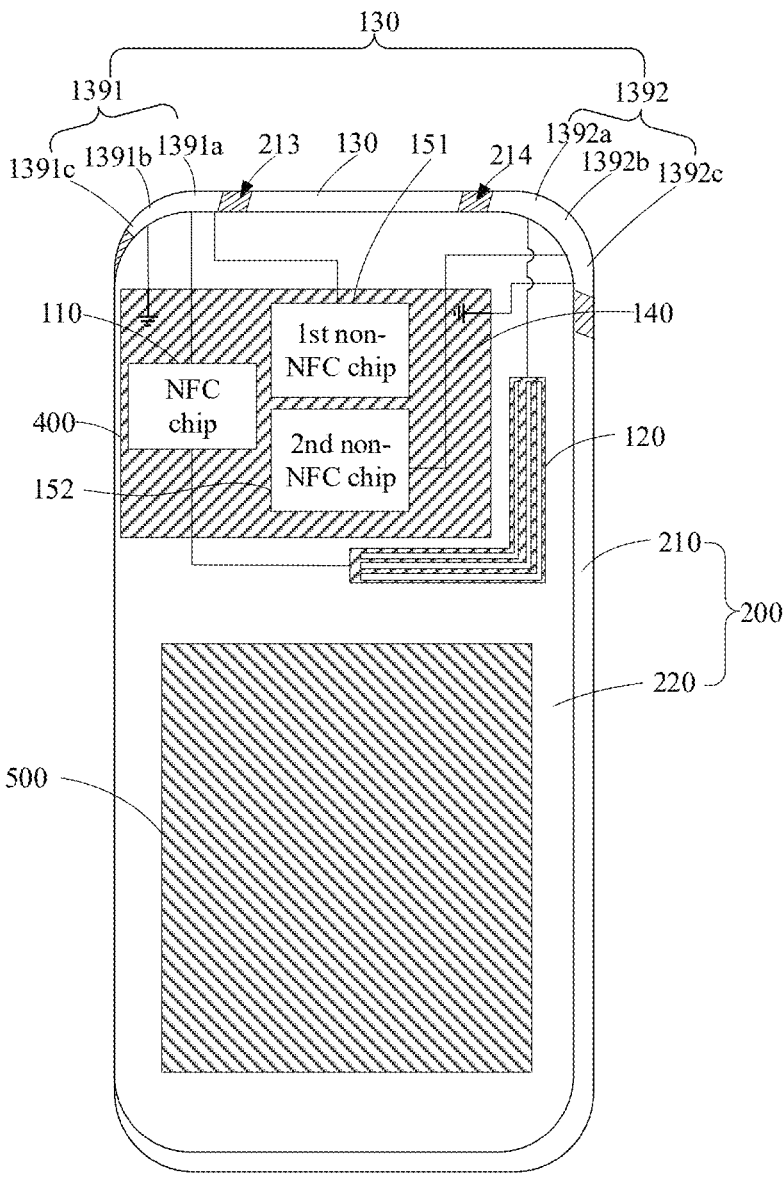
FIG. 17 is a third structural schematic view of an electronic device according to an embodiment of the present disclosure.

In another example, a portion of the second conductive structure 130) is arranged at the upper left corner of the middle frame 200. A portion of the second conductive structure 130 is arranged at the upper right corner of the middle frame 200. Exemplarily, as shown in FIG. 17, FIG. 17 is a third structural schematic view of the electronic device according to an embodiment of the present disclosure. A first straight portion 1391*a* of the first conductive sub-structure 1391 is arranged at the top of the middle frame 200. The first bent portion 1391*b* is arranged at the upper left corner of the middle frame 200. A second straight portion 1391*c* is arranged at the left side of the middle frame 200. A third straight portion 1392*a* of the second conductive sub-structure 1392 is arranged at the top of the middle frame 200. The second bent portion 1392*b* is arranged at the upper right corner of the middle frame 200. A fourth straight portion 1392*c* is arranged at the right side of the middle frame 200.

To be noted that, the second conductive structure 130 of the present disclosure may be arranged on the side frame 210 in other ways. For example, the second conductive structure 130 may be formed by printing. For example, materials containing conductive materials may be printed on the side frame 210 to form the second conductive structure 130. Alternatively, the second conductive structure 130 may be formed by laser, such as being formed on the side frame 210) (the side frame 210) is made of non-metallic materials, such as plastic materials, and so on).

Figure 18:
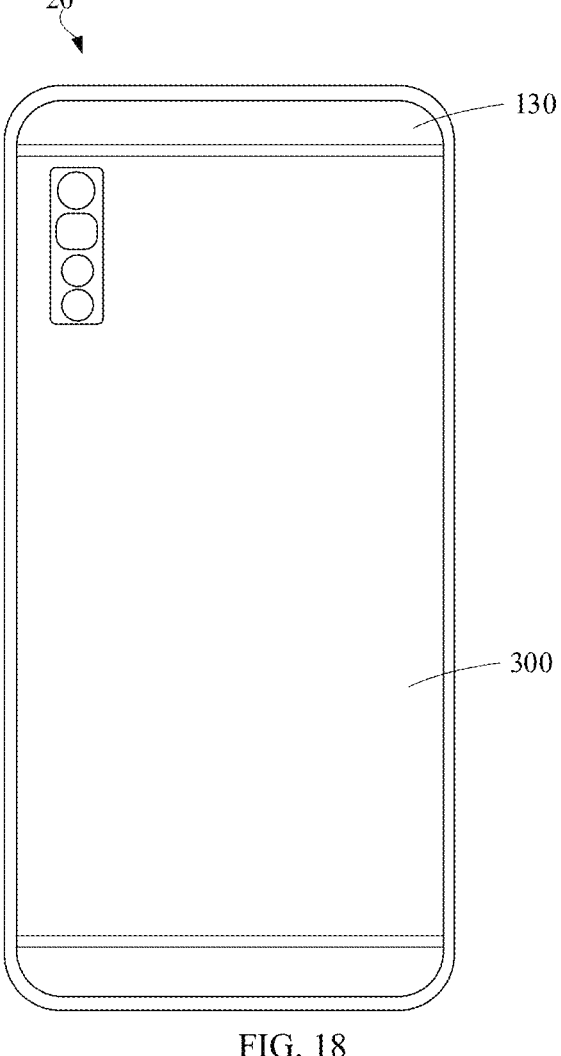
FIG. 18 is a fourth structural schematic view of an electronic device according to an embodiment of the present disclosure.

To be noted that the location where the second conductive structure 130 of the present disclosure is arranged is not limited herein. For example, the second conductive structure 130 may be arranged on the rear cover 300. For example, the second conductive structure 130 may be arranged on an inner surface of the rear cover 300 or on an outer surface of the rear cover 300. It shall be understood that the inner surface of the rear cover 300 is a surface that is not visible when being viewed from the outside of the electronic device 20. The outer surface of the rear cover 300 is a surface of the rear cover 300 that can be seen and can be accessed. As shown in FIG. 18, FIG. 18 is a fourth structural schematic view of the electronic device according to an embodiment of the present disclosure. The rear cover 300 may be made of metal. When forming the second conductive structure 130, the rear cover 300 may be cut into two metal segments, and the two metal segments are spaced apart from each other. Non-metallic material may be disposed between the two metal segments. One of the two metal segments may be served as the second conductive structure 130 (or the two metal segments are both served as the second conductive structures 130, one of the two metal segments is served as the first conductive sub-structure 1391, and the other one of the two metal segments is served as the second conductive sub-structure 1392). Of course, the metal rear cover may be machined to form more metal segments, which are not limited to two metal segments. Of course, the second conductive structure 130 may be arranged on the rear cover 300 in other ways. For example, the rear cover 300 is made of plastics. The second conductive structure 130 is formed on the rear cover 300 (such as on the inner surface of the rear cover 300), which is made of plastics, by printing or lasering. Alternatively, the second conductive structure 130 may be bonded to the plastic rear cover by an adhesive.

It shall be understood that, in the above description, the electronic device 20 is taken as an example only. The electronic device 20 of the present disclosure may further include components such as cameras, sensors, acoustic-electric conversion elements, and so on, which will not be described in detail herein.

The above embodiments of the present disclosure provide a detailed description of the antenna assembly as well as the electronic device. In this specification, specific examples are described to illustrate the principles and implementation of the present disclosure. The above descriptions are only used to facilitate understanding the present disclosure. At the same time, any ordinary skilled person in the art may modify the specific implementations and the application scope based on the idea of the present disclosure. In summary, the specification of the present disclosure shall not be treated as a limitation of the present disclosure.

What is claimed is:

1. An antenna assembly, comprising:
   a near-field communication chip, configured to provide a near-field communication excitation current; and
   a first conductive structure, electrically connected to the near-field communication chip to transmit the near-field communication excitation current, wherein the first conductive structure defines a plurality of first gaps that are dis-communicated from each other on the first conductive structure; at least a portion of the first conductive structure is disposed between each edge of the first conductive structure and each of the plurality of first gaps; when the first conductive structure transmits the near-field communication excitation current, the first conductive structure generates a magnetic field, and the magnetic field generated by the first conductive structure is radiated to an outside through the one or more first gaps.

2. The antenna assembly according to claim 1, wherein the first conductive structure comprises a first side edge and a second side edge opposite to the first side edge, and the more than one first gaps are arranged in sequence in a direction from the first side edge towards the second side edge.

3. The antenna assembly according to claim 2, wherein the first conductive structure further comprises a third side edge and a fourth side edge, the third side edge is connected between an end of the first side edge and an end of the second side edge, the fourth side edge is connected between the other end of the first side edge and the other end of the second side edge, each of a length of the first side edge and a length of the second side edge is greater than each of a length of the third side edge and a length of the fourth side edge.

4. The antenna assembly according to claim 1, wherein a minimum area of a cross section of the first conductive structure along a direction perpendicular to a transmission direction of the near-field communication excitation current is greater than a first predetermined value.

5. The antenna assembly according to claim 1, wherein the first conductive structure is a printed circuit or a metal sheet on a flexible circuit board.

6. The antenna assembly according to claim 5, wherein the first conductive structure comprises a first portion and a second portion, the second portion is bent with respect to the first portion, and each of the first portion and the second portion defines the one or more first gaps.

7. The antenna assembly according to claim 6, further comprising a second conductive structure, wherein the second conductive structure is arranged with a first feed end and a connection end spaced apart from the first feed end, the first feed end is electrically connected to the near-field communication chip, the connection end is electrically connected to the first conductive structure, the second conductive structure is configured to transmit the near-field communication excitation current cooperatively with the first conductive structure.

8. The antenna assembly according to claim 7, further comprising a ground plane, wherein the second conductive structure is arranged with a first ground end, the first ground end is electrically connected to the ground plane.

9. The antenna assembly according to claim 8, wherein the near-field communication chip is configured to provide a differential excitation current, the ground plane comprises a first ground point and a second ground point spaced apart from the first ground point, a conductive path of the ground plane is formed between the first ground point and the second ground point; and the second conductive structure is arranged with a first ground end, the first conductive structure is arranged with a second ground end, the first ground end is electrically connected to the first ground point, the second ground end is electrically connected to the second ground point, the first conductive structure, the conductive path, and the second conductive structure cooperatively form a conductive circuit for transmitting the differential excitation current.

10. The antenna assembly according to claim 7, further comprising a ground plane, wherein the second conductive structure comprises:

a first conductive sub-structure, electrically connected to the near-field communication chip and to the ground plane; and a second conductive sub-structure, spaced apart from the first conductive sub-structure and being electrically connected to the first conductive structure and to the ground plane.

11. The antenna assembly according to claim 7, wherein the second conductive structure defines one or more second gaps; and when the second conductive structure transmits the near-field communication excitation current, the second conductive structure generates a magnetic field, and the magnetic field generated by the second conductive structure is radiated to an outside through the one or more second gaps.

12. The antenna assembly according to claim 11, wherein when the first conductive structure and the second conductive structure transmit the near-field communication excitation current, the first conductive structure generates a first near-field communication radiation field, the second conductive structure generates a second near-field communication radiation field, the first near-field communication radiation field at least partially overlaps with the second near-field communication radiation field.

13. The antenna assembly according to claim 7, further comprising a first non-near-field communication chip configured to provide a first non-near-field communication excitation current, wherein the second conductive structure is further arranged with a second feed end spaced apart from the first feed end, and the second feed end is electrically connected to the first non-near-field communication chip to transmit the first non-near-field communication excitation current.

14. The antenna assembly according to claim 10, further comprising a first non-near-field communication chip and a second non-near-field communication chip, wherein the first non-near-field communication chip is configured to provide a first non-near-field communication excitation current, and the second non-near-field communication chip is configured to provide a second non-near-field communication excitation current;

the first conductive sub-structure is electrically connected to the first non-near-field communication chip, the first conductive sub-structure is configured to transmit the first non-near-field communication excitation current; and the second conductive sub-structure is electrically connected to the second non-near-field communication chip, the second conductive sub-structure is configured to transmit the second non-near-field communication excitation current.

15. A cover assembly, configured on an electronic device, the cover assembly comprising:

an antenna assembly; and a middle frame and a rear cover connected to the middle frame, wherein the antenna assembly comprises:

a near-field communication chip, configured to provide a near-field communication excitation current; and a first conductive structure, electrically connected to the near-field communication chip to transmit the near-field communication excitation current, wherein the first conductive structure defines a plurality of first gaps that are dis-communicated from each other on the first conductive structure; at least a portion of the first conductive structure is disposed between each edge of the first conductive structure and each of the plurality of first gaps; when the first conductive structure transmits the near-field communication excitation current, the first conductive structure generates a magnetic field, and the magnetic field generated by the first conductive structure is radiated to an outside through the one or more first gaps;

wherein the first conductive structure is arranged on a middle plate of the middle frame, and a second conductive structure is arranged a side frame of the middle frame or on the rear cover.

16. An electronic device, comprising:

an antenna assembly; and a middle frame and a rear cover connected to the middle frame, wherein the antenna assembly comprises:

a near-field communication chip, configured to provide a near-field communication excitation current; and a first conductive structure, electrically connected to the near-field communication chip to transmit the near-field communication excitation current, wherein the first conductive structure defines a plurality of first gaps that are dis-communicated from each other on the first conductive structure; at least a portion of the first conductive structure is disposed between each edge of the first conductive structure and each of the plurality of first gaps; when the first conductive structure transmits the near-field communication excitation current, the first conductive structure generates a magnetic field, and the magnetic field generated by the first conductive structure is radiated to an outside through the one or more first gaps; wherein the first conductive structure is arranged on a middle plate of the middle frame, and a second conductive structure is arranged a side frame of the middle frame or on the rear cover.

17. The electronic device according to claim 16, wherein the middle frame comprises a third conductive structure and a fourth conductive structure, the second conductive structure is disposed between the third conductive structure and the fourth conductive structure, a first gap is defined between the third conductive structure and the second conductive structure, and a second gap is defined between the fourth conductive structure and the second conductive structure.

18. The electronic device according to claim 17, wherein the second conductive structure, a part of the third conductive structure, and a part of the fourth conductive structure and are disposed at a same end of the middle frame.

\* \* \* \* \*